(12) United States Patent
Suzuki et al.

(10) Patent No.: US 8,461,485 B2
(45) Date of Patent: Jun. 11, 2013

(54) SOLID WIRE

(75) Inventors: Reiichi Suzuki, Fujisawa (JP); Yu Umehara, Fujisawa (JP)

(73) Assignee: Kobe Steel, Ltd., Kobe-shi (JP)

(*) Notice: Subject to any disclaimer, the term of this patent is extended or adjusted under 35 U.S.C. 154(b) by 755 days.

(21) Appl. No.: 11/945,062

(22) Filed: Nov. 26, 2007

(65) Prior Publication Data

US 2008/0156784 A1 Jul. 3, 2008

(30) Foreign Application Priority Data

Dec. 29, 2006 (JP) ................................ 2006-356866
Mar. 16, 2007 (JP) ................................ 2007-067748

(51) Int. Cl.
*B23K 35/22* (2006.01)
*B23K 5/02* (2006.01)

(52) U.S. Cl.
USPC ..................................... 219/146.1; 219/145.1

(58) Field of Classification Search
USPC ................ 219/146.1, 146.23, 145.1
See application file for complete search history.

(56) References Cited

U.S. PATENT DOCUMENTS

| | | | | |
|---|---|---|---|---|
| 4,331,474 A * | 5/1982 | Espy | | 420/57 |
| 5,550,348 A * | 8/1996 | Masaie et al. | | 219/145.22 |
| 5,672,287 A * | 9/1997 | Masaie et al. | | 219/145.22 |
| 6,054,675 A * | 4/2000 | Kurokawa et al. | | 219/146.1 |
| 6,989,510 B2 * | 1/2006 | Yamaoka et al. | | 219/145.1 |
| 2003/0085211 A1 * | 5/2003 | Ito et al. | | 219/146.1 |
| 2003/0103859 A1 * | 6/2003 | Hauser et al. | | 420/34 |
| 2003/0189034 A1 * | 10/2003 | Kataoka et al. | | 219/146.1 |
| 2004/0050835 A1 * | 3/2004 | Yukio et al. | | 219/145.1 |
| 2005/0045699 A1 * | 3/2005 | Konishi et al. | | 228/214 |
| 2006/0000818 A1 | 1/2006 | Kim et al. | | |
| 2006/0163231 A1 * | 7/2006 | Kobayashi et al. | | 219/146.23 |

FOREIGN PATENT DOCUMENTS

| | | |
|---|---|---|
| CN | 1453096 A | 11/2003 |
| CN | 1714988 A | 1/2006 |
| CN | 1880007 A | 12/2006 |
| JP | 59-45096 | 3/1984 |
| JP | 5-69181 | 3/1993 |
| JP | 5-305476 | 11/1993 |

(Continued)

OTHER PUBLICATIONS

U.S. Appl. No. 11/940,600, filed Nov. 15, 2007, Suzuki et al.

(Continued)

*Primary Examiner* — Sang Paik
(74) *Attorney, Agent, or Firm* — Oblon, Spivak, McClelland, Maier & Neustadt, L.L.P.

(57) ABSTRACT

A solid wire contains in mass percent C 0.005 to 0.080%, Si 0.30 to 1.20%, Mn 1.15 to 1.65%, S 0.050 to 0.200%, P 0.017% or less, O 0.0070% or less, and N 0.0050% or less, wherein $C+(P*5) \leqq 0.135$ mass percent is satisfied, and the remainder includes Fe and impurities, and the content of each of Ti, B, Cr, Ni, Nb, V, Zr, La and Ce as the impurities is controlled to be a certain content or less, and the amount of adhered oil on a surface of the relevant solid wire is controlled to be 1.2 g or less per wire of 10 kg. According to such a configuration, while increase in welding cost is controlled to the minimum, stability of wire feed, burn-through resistance, undercut resistance, and crack resistance becomes excellent, slag and spatter becomes hard to be generated, hardness of weld metal becomes equal to or higher than that of base metal, and brittle fracture becomes hard to occur.

12 Claims, 3 Drawing Sheets

FOREIGN PATENT DOCUMENTS

| | | |
|---|---|---|
| JP | 9-94667 | 4/1997 |
| JP | 9-239583 | 9/1997 |
| JP | 11-104883 | 4/1999 |
| JP | 2922814 | 4/1999 |
| JP | 2000-107881 | 4/2000 |
| JP | 2001-96392 | 4/2001 |
| JP | 3345883 | 9/2002 |
| JP | 2004-195543 | 7/2004 |
| JP | 2004-314099 | 11/2004 |
| JP | 2005-254284 | 9/2005 |
| JP | 2006-15403 | 1/2006 |
| JP | 2006-026643 | 2/2006 |
| KR | 10-0501984 | 7/2005 |
| KR | 10-2006-0050038 | 5/2006 |

OTHER PUBLICATIONS

Office Action issued on Nov. 1, 2011 in the corresponding Japanese Patent Application No. 2007-067748 (with English Translation).

* cited by examiner

SOLID WIRE

BACKGROUND OF THE INVENTION

The present invention relates to a solid wire used for arc welding, and particularly relates to a solid wire for carbon steel usable for arc welding of a sheet.

Recently, improvement in fuel consumption of a car is increasingly demanded in the light of the environmental issue. To response to this, change of a steel sheet to be used is progressively tried from usual mild steel having a tensile strength of 300 MPa or less to a high strength steel sheet having a tensile strength of 400 MPa or more so that sheet thickness is reduced to achieve lightweight.

Here, when sheet thickness is reduced, while substantially no difficulty is found in spot welding, a phenomenon that a steel sheet is locally melted due to arc heat, and eventually a hole is opened, so-called burn through easily occurs in arc welding.

Increase in strength of a steel sheet is typically achieved by cooling control during rolling, and increasing the amount of an element to be added into the steel sheet. However, when the amount of the element to be added into the steel sheet is increased, viscosity of a molten pool during arc welding is increased, thereby blendability is degraded and a weld toe is lose in thickness, so-called undercut tends to occur.

Furthermore, in a point of welding procedure, when welding speed is increased to improve efficiency of welding, arc precedes the molten pool, and thus arc tends to directly impinge upon a molten surface, so that burn through easily occurs. Even if burn through is not brought, when melting reaches to a back of the sheet material (this is sometimes called uranami welding), hot crack is induced extremely easily.

For improving burn-through resistance, JP-A-2001-96392 describes that heat input per deposition is decreased by using a wire having a small diameter of 0.9 mm or less, which is specified in electric resistivity, so that burn through hardly occurs (that is, burn-through resistance is improved).

Moreover, specification of Japanese Patent No. 2922814 describes that Si+Mn and Si*(Si+Mn) in a composition of a wire are specified, and furthermore Ar is mixed with an extremely slight amount (3 to 7%) of $O_2$ gas, thereby burn-through resistance is improved. Such a technique is based on a synergistic effect of an effect of decreasing heat input per deposition by appropriately increasing electric resistivity of the wire, and an effect of decreasing depth of penetration by increasing a ratio of Ar in shielding gas.

Moreover, JP-A-9-94667 and specification of Japanese Patent No. 3345883 describe use of a special welding power supply tip applied with ceramic at an end. This increases electric resistance heat generation between a current supply point at an end of the welding power supply tip and an arc generation point, thereby heat input per deposition is decreased, so that burn-through resistance is improved, and occurrence of undercut is suppressed since arc force is restrained due to current reduction (that is, undercut resistance is improved).

Furthermore, JP-A-2005-254284 describes that Ar and $CO_2$ are used for shielding gas, and a large amount of $O_2$ (5.5 to 15%) is mixed to the shielding gas to change a convection direction of a molten pool, thereby undercut resistance is improved.

While it is previously experientially known that the burn-through resistance and the undercut resistance can be improved by vertical, downward welding, there is a difficulty that a welding position is limited, in addition, when a downward angle is excessively large, welding is hard to be controlled since drop of a bead may occur, or a large amount of spatter may be generated.

However, the wire having a small diameter as described in JP-A-2001-96392 tends to buckle due to the small diameter, and has a difficulty that weldability is degraded since stability of wire feed is bad. Moreover, there is a difficulty that such a wire small in diameter causes increase in cost, leading to increase in welding cost.

Moreover, the difficulty of bad burn-through resistance cannot be overcome only by using a simple wire as described in specification of Japanese Patent No. 2922814. Furthermore, there is a difficulty that when the ratio of Ar is increased in shielding gas in such a way, cost of the shielding gas is increased, leading to increase in welding cost.

On the other hand, use of the special welding power supply tip as described in JP-A-9-94667 and specification of Japanese Patent No. 3345883 increases tip cost, leading to increase in welding cost.

In the arc welding method described in JP-A-2005-254284, there is a difficulty that since the special shielding gas is used, cost of the shielding gas is increased, leading to increase in welding cost. In addition, since a large amount of oxygen is mixed, a large amount of slag or spatter is generated. The slag or spatter leads to degradation in painting adaptability of a weld. Furthermore, there is a difficulty that as the amount of oxygen contained in weld metal is significantly increased, inclusions are increased, consequently hot crack tends to occur (that is, crack resistance is bad).

In addition to the difficulties, for versatile and general sheet welding, it is required for the wire that hardness of weld metal is equal to or higher than hardness of base metal, brittle fracture does not occur in the weld metal, and stability of wire feed is good for smoothly performing welding.

SUMMARY OF THE INVENTION

It is desirable to provide a solid wire in which while increase in welding cost is controlled to the minimum, the stability of wire feed, burn-through resistance, undercut resistance, and crack resistance are excellent, slag and spatter are hardly generated, hardness of weld metal is equal to or higher than hardness of base metal, and brittle fracture does not occur.

A solid wire according to an embodiment of the invention, which overcomes the above difficulties, and is used for arc welding, contains C 0.005 to 0.080 mass percent, Si 0.30 to 1.20 mass percent, Mn 1.15 to 1.65 mass percent, and S 0.050 to 0.200 mass percent, and is controlled to contain P 0.017 mass percent or less, O 0.0070 mass percent or less, and N 0.0050 mass percent or less respectively, in which (content of C)+{(content of P)*5}≦0.135 mass percent is satisfied, and further controlled to contain as impurities Ti 0.15 mass percent or less, Zr 0.10 mass percent or less, B 0.0050 mass percent or less, and Cr, Ni, Nb, V, La and Ce 0.20 mass percent or less respectively, wherein amount of oil adhered on a surface of the relevant solid wire is controlled to be 1.2 g or less per wire of 10 kg.

In the solid wire according to an embodiment of the invention, each of components is specified as above, thereby viscosity and surface tension of a molten pool can be significantly reduced, and consequently the molten pool can be formed deep during arc welding. Thus, since a barrier effect for relieving arc force can be obtained, and thus depth of penetration can be decreased, burn-through resistance can be improved.

Moreover, in the solid wire according to an embodiment of the invention, crack resistance is excellent, amount of slag and amount of spatter are not increased, and undercut resistance is excellent.

In the solid wire according to an embodiment of the invention, Mo is preferably contained at 0.30 mass percent or less.

In the solid wire according to an embodiment of the invention, strength of weld metal can be improved by containing Mo in a particular range.

In the solid wire according to an embodiment of the invention, Al is preferably contained at 0.006 to 0.040 mass percent.

In the solid wire according to an embodiment of the invention, crack resistance can be improved through so-called killed treatment performed by containing Al in a particular range.

The solid wire according to an embodiment of the invention preferably has K, Li, Na and Ca of 0.005 to 0.300 g/10 kg in total per wire of 10 kg adhered on a surface of the wire.

In the solid wire according to an embodiment of the invention, at least one element selected from such an element group is coated or adhered on a surface of the wire within the particular range, thereby the solid wire easily emits electrons, and therefore the relevant element operates as an arc stabilizer in welding using Ar and an oxidizing gas (such as $O_2$ or $CO_2$). Therefore, variation in arc length can be suppressed, and consequently the burn-through resistance can be further improved.

The solid wire according to an embodiment of the invention preferably contains $MoS_2$ of 0.01 to 1.00 g per wire of 10 kg on the surface of the wire.

The solid wire according to an embodiment of the invention has $MoS_2$ coated or adhered on the surface of the solid wire within the particular range, thereby momentary fusion at a current supply point is decreased and thus resistance is decreased, and consequently feed stability of the solid wire can be improved.

The solid wire according to an embodiment of the invention may be applied with copper plating on a surface of the solid wire.

The solid wire according to an embodiment of the invention is covered with copper plating, thereby improvement in stain resistance, improvement in wear resistance of a current supply tip, and improvement in productivity due to an effect of improved drawability during wire production, and reduction in cost associated with the improved productivity can be achieved.

The solid wire according to an embodiment of the invention may be a copper-plating-free wire of which the surface is not applied with copper plating. The surface is unapplied with copper plating, thereby an effect is given, that is, electric resistance is increased at the current supply point, and temperature when the wire reaches an arc generation point is thus increased due to a heating effect. Therefore, the wire becomes in a highly fusible state. Since a power source provides a current only enough to fuse a wire to be fed, the current is decreased in the wire in the highly fusible state, and consequently heat input can be reduced when melting amount is constant. Therefore, depth of penetration can be further reduced, in addition, arc force can be reduced, and therefore undercut resistance can be improved.

According to the solid wire according to an embodiment of the invention, it can be achieved that while increase in welding cost is controlled to the minimum, the stability of wire feed, burn-through resistance, undercut resistance, and crack resistance are excellent, slag and spatter are hardly generated, hardness of weld metal is equal to or higher than hardness of base metal, and brittle fracture hardly occur.

BRIEF DESCRIPTION OF THE DRAWINGS

FIGS. 1A and 1B are diagrams schematically showing an aspect of arc welding, wherein

DESCRIPTION OF THE PREFERRED EMBODIMENT

Next, the best mode for carrying out the solid wire according to an embodiment of the invention is described in detail.

The inventors noticed behavior of the molten pool and behavior of the weld metal in the vertical downward welding, and made earnest study considering that if the molten pool and the weld metal were able to show the same behavior as that of the above without regard to welding positions such as positions of horizontal fillet welding, flat welding, horizontal welding, overhead welding, and vertical upward welding, arc welding was able to be performed more preferably.

Figure 1A:
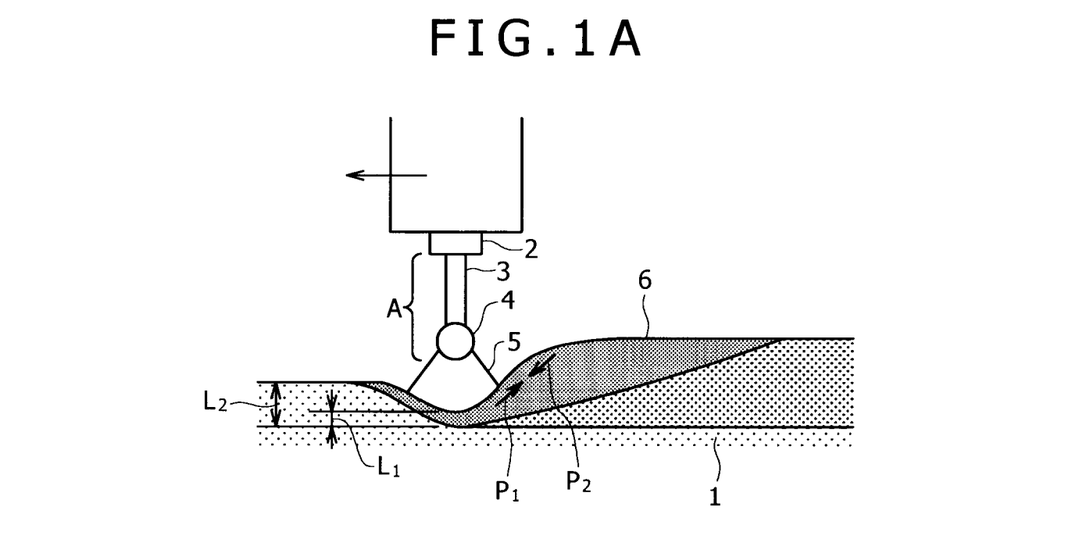
FIG. 1A is a diagram schematically showing an aspect of arc welding using a usual solid wire.
Figure 1B:
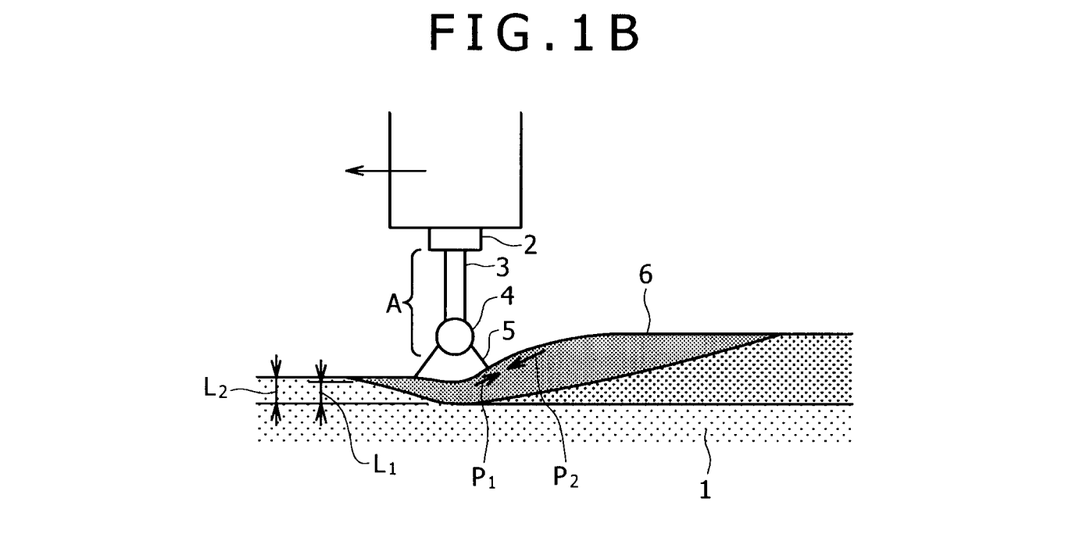
FIG. 1B is a diagram schematically showing an aspect of arc welding using a solid wire according to an embodiment of the invention.
Figure 2:
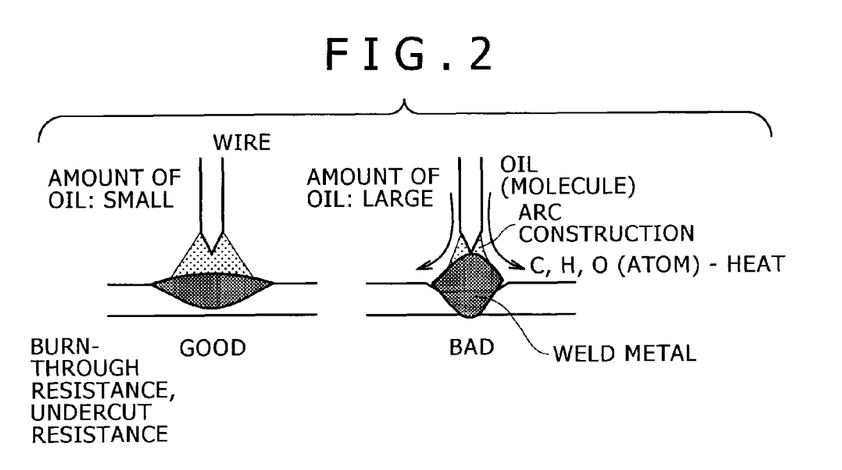
FIG. 2 is a diagram for explaining effects of oil adhered on a surface of a solid wire on an arc shape, burn-through resistance, and undercut resistance.
Figure 3:
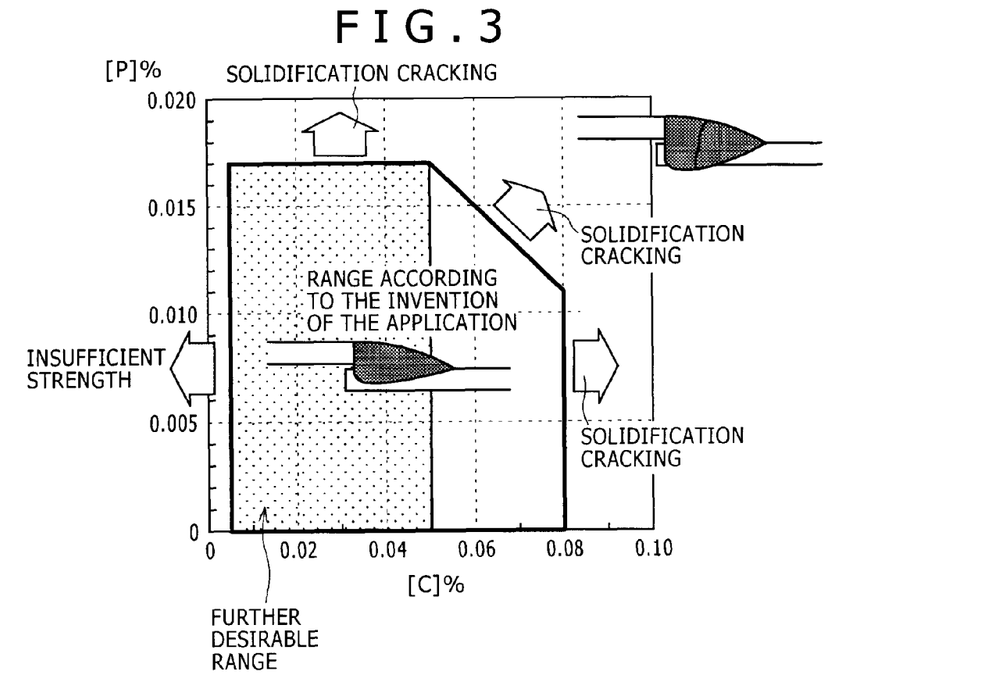
FIG. 3 is a diagram for explaining appropriate content ranges of C and P, which were established for completing the solid wire of an embodiment of the invention.

First, a principle of a solid wire according to an embodiment of the invention completed by the inventors is described with reference to FIGS. 1A to 3. FIGS. 1A to 1B are diagrams schematically showing an aspect of arc welding, wherein FIG. 1A is a diagram schematically showing an aspect of arc welding using a usual solid wire, and FIG. 1B is a diagram schematically showing an aspect of arc welding using a solid wire according to an embodiment of the invention. FIG. 2 is a diagram for explaining effects of oil adhered on a surface of a solid wire on an arc shape, burn-through resistance, and undercut resistance. FIG. 3 is a diagram for explaining appropriate content ranges of C and P, which were established for completing the solid wire of an embodiment of the invention.

As shown in FIG. 1A, viscosity and surface tension of a molten pool 6 are large in arc welding of a steel sheet (thin sheet) 1 using a usual solid wire 3. Therefore, since forcing up $P_1$ of the molten pool 6 by arc force and the surface tension becomes large compared with gravity $P_2$, lowering of the molten pool 6 itself by the gravity $P_2$ is decreased. That is, depth $L_1$ of the molten pool 6 directly below arc is decreased, and depth of penetration $L_2$ is increased.

Moreover, a portion from a current supply point between a tip 2 and a solid wire 31 (mainly an end of the tip 2) to a generation point of arc 5, so-called an extension portion A, and a droplet 4 itself formed at an end of the portion A are reduced in resistance heating.

Thus, as shown in FIG. 1B, the inventors understood that in the vertical downward welding of the steel sheet (thin sheet) 1 using the usual solid wire 3, the molten pool 6 was moved from a back of arc 5 to a position directly below the arc 5 by gravity, that is, a deep molten pool 6 was continuously formed directly below the arc 5, so that a barrier effect for relieving arc force was operated, thereby burn through was hard to occur (improvement in burn-through resistance). Moreover, it was known that even if undercut was momentarily produced, an effect of lowering the molten pool 6 by gravity was significantly operated, and thus weld metal in the molten pool 6 flew into the relevant undercut portion, therefore the undercut was eliminated during solidification (improvement in undercut resistance).

The reason for this is as follows. That is, since dropping force of the molten pool 6, which is formed in a region from the position directly below the arc 5 to the back of a weld, is increased, the depth $L_1$ of the molten pool 6 directly below the arc 5 is increased so that effects of arc force are protected, thereby depth of penetration $L_2$ is decreased.

As a result of earnest study, the inventors found that electric resistance of a solid wire itself was increased, so that resistance heating of the extension portion and resistance heating of the droplet itself were increased to increase temperature, and thus melt of the wire due to arc heat is decreased so that welding heat input was decreased, in addition, a composition of the solid wire was optimized, thereby viscosity and surface tension of the molten pool were significantly decreased so that an effect of gravity on the molten pool was sufficiently drawn, consequently the above mechanism was able to be achieved even in positions other than the vertical downward welding position.

During the study, it was known that when viscosity and surface tension of the molten pool was decreased by increasing oxygen by a previously known method such as increasing oxygen in gas components, or decreasing a strong deoxidization component such as Si or Mn contained as a component of the solid wire, difficulties frequently occurred, including production of a large amount of slug, generation of blow holes, degradation in bead shape, and increased amount of spatter.

Moreover, as an approach for overcoming such difficulties, the inventors found a fact that a large amount of S was added within an appropriate range, thereby slag and spatter were hardly generated, and viscosity and surface tension of the molten pool was able to be extremely reduced while a bead shape was kept good. In addition, the inventors found a fact that as shown in FIG. 2, oil coated (adhered) on a surface of a solid wire for securing certain feed performance was thermally decomposed during welding, and took heat from arc during such decomposition so as to decrease arc temperature, therefore arc was contracted so that heat was more significantly concentrated to a base metal, and spread of molten metal was reduced, consequently the burn-through resistance or undercut resistance was degraded, or depth of penetration was increased, leading to solidification crack being easily occurred. Therefore, it was found that the amount of oil adhered on the surface of the solid wire was controlled to be small, resulting in expansion of an arc area, consequently the effect given by containing S at a high content was able to be further accelerated.

However, it is known that when S is contained at high content, solidification crack generally tends to occur, and therefore, for example, JIS Z3312 specifies an upper limit of S to be 0.030 mass percent in order to prevent the solidification crack.

As a result of study, the inventors found that as shown in FIG. 3, an upper limit was set for each of C and P, so that C and P were strictly limited within a range compared with a usual range specified by JIS Z3312 (upper limit value of C: 0.15 mass percent, and upper limit value of P: 0.030 mass percent), and a value calculated from (content of C)+{(content of P)*5} was 0.135 mass percent or less was satisfied, thereby even if S was contained at high content, solidification crack did not occur.

According to such findings, the inventors completed the solid wire according to an embodiment of the invention suitable for arc welding.

The solid wire according to an embodiment of the invention completed by the inventors contains C 0.005 to 0.080 mass percent, Si 0.30 to 1.20 mass percent, Mn 1.15 to 1.65 mass percent, and S 0.050 to 0.200 mass percent, and is controlled to contain P 0.017 mass percent or less, O 0.0070 mass percent or less, and N 0.0050 mass percent or less respectively, in which (content of C)+{(content of P)*5}≦0.135 mass percent is satisfied, and the remainder includes Fe and impurities, and further controlled to contain as impurities Ti 0.15 mass percent or less, Zr 0.10 mass percent or less, B 0.0050 mass percent or less, and Cr, Ni, Nb, V, La and Ce 0.20 mass percent or less respectively, wherein amount of oil adhered on a surface of the relevant solid wire is controlled to be 1.2 g or less per wire of 10 kg.

Hereinafter, reasons for such numeric limitation in the solid wire according to an embodiment of the invention are described.

C: 0.005 to 0.080 Mass Percent

C has a deoxidization function, and exhibits an effect of improving strength of weld metal. Since multilayer welding is not performed in sheet welding, reduction in strength due to reheat need not be considered, and strength equal to or higher than that of a base metal can be obtained even in a small addition amount of C in steel sheets from a typically used, mild steel sheet in a class of 300 MPa or less to a high tensile steel sheet in a 590 MPa class.

However, when the content of C is decreased to less than 0.005 mass percent, strength of weld metal is decreased to a strength being able to be used only for mild steel, that is, weld metal becomes non-versatile. Therefore, C needs to be contained at 0.005 mass percent or more.

On the other hand, when the content of C is increased, crack resistance is significantly degraded as described before. Moreover, explosion of CO near arc causes increase in spatter, in addition, increase in fume. Furthermore, since deoxidization becomes excessive, oxygen in a molten pool is decreased, consequently viscosity and surface tension of the molten pool are increased. Therefore, the barrier effect for relieving arc force is reduced, and consequently burn-through resistance and undercut resistance tend to be degraded. Therefore, in additional consideration of securing crack resistance, C needs to be contained at 0.080 mass percent or less, and desirably contained at 0.050 mass percent or less.

Si: 0.30 to 1.20 Mass Percent

While Si is necessary for securing strength of weld metal, it has a function of increasing electric resistance of the solid wire. When Si is contained at less than 0.30 mass percent, strength of the weld metal is decreased to a strength being able to be used only for mild steel. Moreover, since electric resistance of the solid wire becomes excessively small, a current value per wire feed is increased. As a result, since heat input is increased, the burn-through resistance and the undercut resistance tend to be degraded. Therefore, Si needs to be contained at 0.30 mass percent or more.

On the other hand, when the content of Si exceeds 1.20 mass percent, deoxidization becomes excessive, thereby oxygen in the molten pool is decreased, and consequently viscosity and surface tension of the molten pool are increased. Therefore, the barrier effect for relieving arc force is reduced, and consequently the burn-through resistance and the undercut resistance tend to be degraded. When Si is excessive, weld metal is embrittled, consequently soundness of a welded part may be lost. Therefore, Si needs to be contained at 1.20 mass percent or less, and is preferably contained at 0.75 mass percent or less.

Mn: 1.15 to 1.65 Mass Percent

Similarly, while Mn is necessary for securing strength of weld metal, it has a function of increasing electric resistance of the solid wire. When the content of Mn is less than 1.15 mass percent, strength of the weld metal is decreased to a strength being able to be used only for mild steel. Moreover, since electric resistance of the solid wire becomes excessively small, a current value per wire feed is increased. As a result, since heat input is increased, the burn-through resistance and the undercut resistance tend to be degraded. Moreover, when the content of Mn is excessively low, weld metal is embrittled, consequently soundness of a welded part may be lost. Therefore, Mn needs to be contained at 1.15 mass percent or more.

On the other hand, when the content of Mn exceeds 1.65 mass percent, deoxidization occurs excessively significantly, thereby oxygen in the molten pool is decreased, and consequently viscosity and surface tension of the molten pool are increased. Therefore, since weld metal in the molten pool hardly falls into a position directly below arc, the barrier effect for relieving arc force is reduced, and consequently the burn-through resistance and the undercut resistance tend to be degraded. Moreover, since a large amount of slag is generated, painting adaptability of a weld is degraded. Therefore, Mn needs to be contained at 1.65 mass percent or less.

S: 0.050 to 0.200 Mass Percent

S is the most important element in an embodiment of the invention, and has a function of reducing viscosity and surface tension of the molten pool. S is contained at an appropriate amount, so that even if arc precedes the molten pool, since the barrier effect for relieving arc force is easily obtained by the molten pool having low viscosity and low surface tension, the burn-through resistance and the undercut resistance can be improved. S needs to be contained at 0.050 mass percent or more, and preferably contained at 0.080 mass percent or more to obtain such an effect.

On the other hand, when the content of S exceeds 0.200 mass percent, not only surface tension of the molten pool, but also surface tension of a droplet formed at an end of the solid wire is significantly reduced, consequently the droplet cannot keep a spherical shape. In addition, since the molten pool is formed with an excessively large thickness, even if arc length is provided long, a short circuit condition is made, consequently spatter is extremely increased. Moreover, even if other elements are adjusted in content, improvement in crack resistance cannot be achieved, consequently when melting reaches to a back of a steel sheet, hot crack significantly tends to occur. Furthermore, viscosity of the molten pool is excessively decreased, thereby a bead tends to drop due to a gravity effect, so that the bead is hardly formed at an upper plate side in lap fillet welding, consequently the undercut resistance tends to be degraded. Furthermore, weld metal may be embrittled, leading to loss of soundness of a welded part. Therefore, S needs to be contained at 0.200 mass percent or less.

P: 0.017 Mass Percent or Less

Since P significantly degrades crack resistance like C, the content of P is preferably decreased to the utmost. P is allowed to be contained up to 0.030 mass percent in JIS Z 3312. However, in an embodiment of the invention, since the content of S is relatively reduced to improve crack resistance. When the content of P exceeds 0.017 mass percent, solidification crack tends to occur when melting reaches to the back of the steel sheet, therefore the content needs to be controlled to be 0.017 mass percent or less. However, as described later, the upper limit of P needs to be further reduced depending on the content of C. Moreover, when the content of P is increased, a phenomenon such as embrittlement of weld metal or increase in amount of spatter also occurs.

O: 0.0070 Mass Percent or Less

The content of O needs to be controlled small for suppressing reduction in crack resistance due to adding S. When the content of O exceeds 0.0070 mass percent, the molten pool is increased in oxygen content, consequently inclusions are heavily produced, leading to crack or production of a large amount of slug. Particularly when S is actively added, crack resistance needs to be seriously considered to be secured. In consideration of this, O needs to be limited further strictly. When the content of O exceeds the 0.0070 mass percent, while the burn-through resistance is unproblematically reduced, viscosity of the molten pool is excessively reduced, and therefore a bead tends to drop due to a gravity effect, so that a bead is hardly formed at an upper plate side in lap fillet welding, consequently undercut resistance tends to be degraded. Therefore, the content of O is specified to be 0.0070 mass percent or less.

N: 0.0050 Mass Percent or Less

The upper limit of N is necessary for suppressing reduction in crack resistance due to adding S. When the content of N exceeds 0.0050 mass percent, bonding strength of a crystal grain boundary is reduced, and inclusions are heavily produced, leading to crack. Particularly when S is actively added, crack resistance needs to be seriously considered to be secured. In consideration of this, N needs to be limited further strictly. Moreover, when the content of N exceeds 0.0050 mass percent, weld metal may be embrittled, consequently a welded part may lose soundness. Furthermore, when the content of N exceeds 0.0050 mass percent, viscosity of the molten pool is excessively reduced, and therefore a bead tends to drop due to a gravity effect, so that a bead is hardly formed at an upper plate side in lap fillet welding, consequently undercut resistance tends to be degraded. Therefore, the content of N needs to be 0.0500 mass percent or less.

(Content of C)+{(Content of P)*5}≦0.135 Mass Percent

C and P must be particularly noticed to prevent degradation of crack resistance due to containing S at high content. While C and P are independently specified in upper limit value as described before, when each of the elements is contained at relatively high content, crack tends to occur. Therefore, a case that both contents of the elements are relatively high must be avoided. When a value calculated from (content of C)+{(content of P)*5} is 0.135 or less, crack resistance is not degraded, therefore the value of 0.135 is specified as the upper limit value.

The Remainder Including Fe and Impurities

The solid wire of an embodiment of the invention contains the remainder including Fe and impurities. In an embodiment of the invention, Ti, B, Cr, Ni, Nb, V, Zr, La and Ce are specified in allowable content as the impurities respectively. It is controlled to contain as the impurities Ti 0.15 mass percent or less, Zr 0.10 mass percent or less, B 0.0050 mass percent or less, and Cr, Ni, Nb, V, La and Ce 0.20 mass percent or less respectively.

When the content of each of Cr, Ni, Nb, V, Zr, La and Ce is increased, viscosity and surface tension of the molten pool are increased. As a result, since metal being melted in the molten pool hardly falls into a position directly below arc, the barrier effect for relieving arc force is reduced, consequently the burn-through resistance and the undercut resistance tend to be degraded, in addition, a large amount of spatter is generated.

Moreover, since the elements other than Ni are to be oxidized, a large amount of slag is produced, leading to degradation in painting adaptability. Moreover, when the content of B is increased, the crack resistance tends to be significantly degraded.

That is, the elements are harmful in the application, and even if they are actively added, the elements provide no advantages for an object of an embodiment of the invention, therefore the elements are desirably small in content to the utmost. In an embodiment of the invention, it is controlled that the content of Ti is 0.15 mass percent or less, the content of Zr is 0.10 mass percent or less, the content of B is 0.0050 mass percent or less, and the content of Cr, Ni, Nb, V, La and Ce are 0.20 mass percent or less respectively. More preferably, it is controlled that the content of Ti, Cr and Ni are 0.05 mass percent or less respectively, the content of Nb, V, Zr, La and Ce are 0.01 mass percent or less respectively, and the content of B is 0.0030 mass percent or less. It is noted that while the elements are inevitably contained in a typical metal, they are allowed to be contained in the solid wire of an embodiment of the invention if the content of them are within the described range respectively.

Amount of Oil Adhered on Surface of the Relevant Solid Wire: 1.2 g or Less Per Wire of 10 kg Oil is generally coated (adhered) on a surface of the solid wire for improving slidability to improve feed performance. However, as described with reference to FIG. 2, the oil is thermally decomposed during welding, and takes heat from arc during such decomposition so as to decrease arc temperature. Arc has a property that when heat is taken from arc, the arc is contracted (increased in density of arc column) to stabilize arc temperature. In such a state, an arc shape (conical shape) is thinned, and an arc area is reduced. As a result, heat is more significantly concentrated to a base metal, and spread of molten metal is reduced, consequently the burn-through resistance or undercut resistance is degraded, and depth of penetration is increased, so that solidification crack easily occurs.

Therefore, amount of oil to be adhered (amount of adhered oil) is preferably reduced to the utmost in the solid wire of an embodiment of the invention that seriously considers the burn-through resistance and the undercut resistance. By reducing the amount of adhered oil, arc temperature is prevented from being decreased, so that spread arc can be secured, consequently expansion of the molten pool due to increased content of S, or reduction in depth of penetration due to dispersed arc force can be effectively exhibited.

Furthermore, when the amount of adhered oil exceeds 1.2 g per solid wire of 10 kg (amount of adhered oil/amount of solid wire=1.2 g/10 kg (that is, 0.012%)), arc is constructed, therefore the burn-through resistance or the undercut resistance is degraded as above. Moreover, C generated by thermal decomposition of oil is contained in weld metal, leading to reduction in crack resistance.

Therefore, the amount of adhered oil on the surface of the solid wire needs to be controlled to be 1.2 g or less per the solid wire of 10 kg in an embodiment of the invention.

It is noted that, for example, in a welding machine having a curved feeder section, feed performance of the solid wire can be secured by coating $MoS_2$ on the wire, or by using a solid wire of which the surface is not applied with copper plating. As a kind of oil to be coated, any of vegetable oil, animal oil, and mineral oil can be used.

Moreover, the solid wire of an embodiment of the invention may further contain Mo 0.30 mass percent or less, or Al 0.006 to 0.040 mass percent.

Mo: 0.30 Mass Percent or Less

Mo can increase strength of weld metal. While a lower limit below which such an effect is not advantageous does not particularly exist, when Mo is contained at 0.05 mass percent or more, the effect can be conspicuously obtained.

On the other hand, when the content of Mo exceeds 0.30 mass percent, viscosity and surface tension of the molten pool are increased. As a result, since metal melted in the molten pool hardly falls to a position directly below arc, the barrier effect for relieving arc force is reduced, consequently the burn-through resistance or the undercut resistance tends to be degraded. In addition, a large amount of spatter is generated. Therefore, Mo is desirably contained at 0.30 mass percent or less.

Al: 0.006 to 0.040 Mass Percent

Since Al is a strong deoxidizing element, if a large amount of Al is added, viscosity and surface tension of the molten pool are increased. Therefore, it brings a negative effect for improving the burn-through resistance or the undercut resistance. However, to achieve improvement in crack resistance by reducing the content of O contained in the solid wire to the utmost, a small amount of Al is added to perform so-called killed treatment so that oxide particles or nitride particles are dispersed to refine crystal grains, thereby crack resistance can be improved. Furthermore, as an advantageous point, when a small amount of Al is added, the Al is hard to cause slag even if it is oxidized.

Such an effect can be obtained by containing Al at 0.006 mass percent or more. On the other hand, when Al is contained at more than 0.040 mass percent, viscosity and surface tension of the molten pool are increased so large that they cannot be disregarded, resulting in degradation of the burn-through resistance and undercut resistance. Moreover, spatter is increased, and a large amount of slag is abruptly produced. Therefore, Al is preferably contained at 0.006 to 0.040 mass percent.

Moreover, in the solid wire of an embodiment of the invention, at least one of elements selected from K, Li, Na and Ca is desirably adhered on a surface of the wire at 0.005 to 0.300 g per wire of 10 kg in total. Furthermore, in the solid wire of an embodiment of the invention, it is more desirable that $MoS_2$ is adhered at 0.01 to 1.00 g per wire of 10 kg on the surface of the wire.

K, Li, Na and Ca Adhered on Surface of Wire: 0.005 to 0.300 g Per Wire of 10 kg in Total While no problem occurs even if K, Li, Na and Ca are not contained, these elements have a function of acting as an arc stabilizer in welding using Ar and an oxidizing gas ($O_2$, $CO_2$). When these elements exist near a surface of a droplet, electrons are easily emitted, which is effective for stabilizing arc. If arc is unstable, arc length is varied, in addition, arc force is varied. Since the burn-through resistance tends to be degraded thereby, arc is desirably stable to the utmost. Stabilization of arc can be achieved by coating or containing at least one of the elements acting as the arc stabilizer. The effect can be conspicuously achieved by adhering the elements at 0.005 g per wire of 10 kg (0.5 ppm in terms of weight to the whole wire) or more in total.

However, when the elements are adhered at more than 0.300 g per wire of 10 kg (30 ppm in terms of weight to the whole wire) in total, the effect of stabilizing arc is saturated, in addition, lubricity of a surface of the solid wire maybe rather degraded, resulting in reduction in feed stability. Therefore, 0.300 g per wire of 10 kg is specified to be an upper limit value from a practical viewpoint.

The content of the elements can be obtained in the following way: a solid wire in a certain weight (10 kg) is sampled, then calculation is made on difference between values of amount of K, Li, Na and Ca measured from total analysis, and values of them measured as amount of the elements in a non-surface or bulk remained after solving a surface by an acid or the like, and the amount of surface-existent substances obtained from the difference is defined as the content of the elements.

The elements are hardly added in ingoting. As a method of coating the elements on the surface of the solid wire, they can be added near the surface through steps of (a) for example, using a drawing lubricant containing K, Li, Na and Ca such as potassium carbonate, lithium carbonate, sodium carbonate, and calcium carbonate during a wire drawing step to leave the elements on the surface of the solid wire; (b) for example, dipping the solid wire in a solution containing K, Li, Na and Ca, and then annealing the solid wire to diffuse the elements into grain boundaries or grains on the surface of the solid wire; (c) for example, performing copper plating to the solid wire using a potassium cyanide solution or sodium cyanide solution, and (d) for example, coating an oil containing ions of K, Li, Na and Ca as a feeding lubricant.

$MoS_2$ Adhered on Surface of Wire: 0.01 to 1.00 g Per Wire of 10 kg

When $MoS_2$ exists on the surface of the solid wire, since momentary fusion at a current supply point is decreased, so that resistance is decreased, feed stability of the solid wire is improved. When the feed stability of the solid wire is unstable, arc length is also unstable, consequently arc force is varied. Since the burn-through resistance is easily degraded thereby, the feed stability of the solid wire is desirably stable to the utmost. When $MoS_2$ is coated, the burn-through resistance can be improved, and such an effect becomes advantageous by coating $MoS_2$ on the surface at 0.01 g per wire of 10 kg (1 ppm in terms of weight) or more.

On the other hand, even if $MoS_2$ is coated on the surface of the wire at more than 1.00 g per wire of 10 kg (100 ppm in terms of weight), $MoS_2$ tends to be deposited within a feed liner or current supply tip, leading to plugging, so that lubricity is rather degraded, consequently the feed stability may be reduced. Therefore, the content of $MoS_2$ coated (contained) on (in) the surface of the solid wire is desirably 1.00 g or less per wire of 10 kg.

As a method of coating $MoS_2$ on the solid wire, there is a method of mixing $MoS_2$ into the drawing lubricant in the wire drawing step, and leaving it to a final diameter stage, or a method of mixing $MoS_2$ into a lubricant to be coated at a finish diameter stage.

The solid wire of an embodiment of the invention may be covered with copper plating.

Copper Plating

In a typical solid wire, a surface of a wire is covered with copper plating, thereby improvement in stain resistance, keeping of wear resistance of a current supply tip, and an effect of improving drawability in production of the solid wire and improvement in productivity due to the effect, and reduction in cost can be achieved.

When the surface of the wire is not covered with copper plating, electric resistance at a current supply portion is increased. A heating effect at that time increases temperature when the solid wire reaches to an arc generation point, consequently the solid wire is into an easily meltable state. Since a power source provides a current sufficient to melt a solid wire to be fed, the current is reduced in the solid wire in the meltable state, and if the melting amount is constant, heat input can be decreased. Therefore, depth of penetration can be further decreased, so that arc force can be also reduced. Thus, the undercut resistance can be improved.

The solid wire according to an embodiment of the invention can be manufactured according to a usual method. For example, ingot steel having the above composition is ingoted using a converter, an electric furnace and the like, the obtained ingot steel is subjected to a continuous casting method or an ingot casting method to manufacture a steel material (such as billet), then the manufactured steel material is heated and then subjected to hot rolling (extrusion rolling), and furthermore subjected to dry, cold rolling (cold drawing), so that a welding wire, for example, 5.5 mm in diameter (sometimes called wire source) is manufactured, and then the welding wire is subjected to annealing and pickling as needed for drawing, and consequently a solid wire having a final wire diameter (for example, 1.2 mm in diameter) can be manufactured.

In drawing, surface treatment can be performed according to various methods depending on necessity. As the methods, (1) a copper plating treatment may be performed in a wet process, (2) K, Li, Na and Ca may be added into a copper plating bath in the copper plating treatment so that the elements are added as elements in a copper plating layer, (3) a drawing lubricant containing K, Li, Na, Ca and $MoS_2$ may be used so that an appropriate amount of each of them is remained, (4) a wire rod may be dipped in a solution containing K, Li, Na and Ca, then subjected to annealing so that K, Li, Na and Ca are diffused into grain boundaries or grains near a surface, (5) oil may be coated for feed lubrication and rust prevention, and (6) K, Li, Na, Ca and $MoS_2$ may be solved or dispersed in the oil so that they are remained on a surface of the relevant solid wire. It is noted that the surface treatment that can be performed to the solid wire of an embodiment of the invention is not limitedly performed according to the above methods, and may be performed according to the other methods. In addition, even if surface treatment is performed according to any optional method, if a resultantly obtained solid wire is within a scope of an embodiment of the invention, the same advantages are exhibited during and after welding.

EXAMPLES

Next, regarding the solid wire of an embodiment of the invention, examples that satisfy requirements of an embodiment of the invention and comparative examples that do not satisfy the requirements of an embodiment of the invention are described in detail in contrast with each other.

Ingot steel was ingoted by an electric furnace, then the ingot steel was subjected to extrusion rolling and cold drawing so that welding wires 5.5 mm in diameter were manufactured, and then the welding wire were drawn into a wire having a diameter of 2.4 mm, and the drawn wire were subjected to intermediate annealing and copper plating treatment as needed for intermediate drawing, and furthermore subjected to finish drawing, and then the drawn wires were subjected to skin-pass and coated with lubricating oil, and consequently solid wires, which have a final wire diameter of 1.2 mm, and have compositions shown in Tables 1 to 3 respectively, were manufactured. K, Li, Na and Ca were contained in a solid lubricant used for cold drawing, and left as needed. $MoS_2$ was dispersed in the lubricating oil, and left as needed. O was controlled by adjusting conditions of temperature, time, and atmospheric gas during annealing. The remainder of a chemical composition of each wire includes Fe and inevitable impurities other than elements described in Tables 1 to 3.

Solid wires of No. 1 to 101 manufactured in this way were evaluated in respective evaluation items of (1) burn-through resistance, (2) undercut resistance, (3) hardness of weld metal, (4) crack resistance, (5) spatter generation, (6) feed stability, (7) an encapsulation ratio of slug, and (8) Charpy absorbed energy. Evaluation methods of the evaluation items of (1) to (8) are as follow.

TABLE 1

| No. | C (mass %) | Si (mass %) | Mn (mass %) | P (mass %) | S (mass %) | Cr (mass %) | Ni (mass %) | Al (mass %) | Ti (mass %) | Nb (mass %) | V (mass %) | Zr (mass %) |
|---|---|---|---|---|---|---|---|---|---|---|---|---|
| 1  | 0.035 | 0.74 | 1.40 | 0.008 | 0.120 | — | — | 0.002 | — | — | — | — |
| 2  | 0.035 | 0.74 | 1.40 | 0.008 | 0.120 | — | — | 0.002 | — | — | — | — |
| 3  | 0.050 | 0.50 | 1.50 | 0.015 | 0.053 | — | — | 0.006 | — | — | — | — |
| 4  | 0.050 | 0.50 | 1.50 | 0.015 | 0.053 | — | — | 0.006 | — | — | — | — |
| 5  | 0.035 | 0.74 | 1.40 | 0.008 | 0.120 | — | — | 0.002 | — | — | — | — |
| 6  | 0.035 | 0.74 | 1.40 | 0.008 | 0.120 | — | — | 0.002 | — | — | — | — |
| 7  | 0.050 | 0.50 | 1.50 | 0.015 | 0.053 | — | — | 0.006 | — | — | — | — |
| 8  | 0.050 | 0.50 | 1.50 | 0.015 | 0.053 | — | — | 0.006 | — | — | — | — |
| 9  | 0.035 | 0.74 | 1.40 | 0.008 | 0.120 | — | — | 0.002 | — | — | — | — |
| 10 | 0.035 | 0.74 | 1.40 | 0.008 | 0.120 | — | — | 0.002 | — | — | — | — |
| 11 | 0.050 | 0.50 | 1.50 | 0.015 | 0.053 | — | — | 0.006 | — | — | — | — |
| 12 | 0.050 | 0.50 | 1.50 | 0.015 | 0.053 | — | — | 0.006 | — | — | — | — |
| 13 | 0.035 | 0.74 | 1.40 | 0.008 | 0.120 | — | — | 0.002 | — | — | — | — |
| 14 | 0.035 | 0.74 | 1.40 | 0.008 | 0.120 | — | — | 0.002 | — | — | — | — |
| 15 | 0.050 | 0.50 | 1.50 | 0.015 | 0.053 | — | — | 0.006 | — | — | — | — |
| 16 | 0.050 | 0.50 | 1.50 | 0.015 | 0.053 | — | — | 0.006 | — | — | — | — |
| 17 | 0.035 | 0.74 | 1.40 | 0.008 | 0.120 | — | — | 0.002 | — | — | — | — |
| 18 | 0.035 | 0.74 | 1.40 | 0.008 | 0.120 | — | — | 0.002 | — | — | — | — |
| 19 | 0.050 | 0.50 | 1.50 | 0.015 | 0.053 | — | — | 0.006 | — | — | — | — |
| 20 | 0.050 | 0.50 | 1.50 | 0.015 | 0.053 | — | — | 0.006 | — | — | — | — |
| 21 | 0.035 | 0.74 | 1.40 | 0.008 | 0.120 | — | — | 0.002 | — | — | — | — |
| 22 | 0.035 | 0.74 | 1.40 | 0.008 | 0.120 | — | — | 0.002 | — | — | — | — |
| 23 | 0.050 | 0.50 | 1.50 | 0.015 | 0.053 | — | — | 0.006 | — | — | — | — |
| 24 | 0.050 | 0.50 | 1.50 | 0.015 | 0.053 | — | — | 0.006 | — | — | — | — |
| 25 | 0.035 | 0.74 | 1.40 | 0.008 | 0.120 | — | — | 0.002 | — | — | — | — |
| 26 | 0.035 | 0.74 | 1.40 | 0.008 | 0.120 | — | — | 0.002 | — | — | — | — |
| 27 | 0.050 | 0.50 | 1.50 | 0.015 | 0.053 | — | — | 0.006 | — | — | — | — |
| 28 | 0.050 | 0.50 | 1.50 | 0.015 | 0.053 | — | — | 0.006 | — | — | — | — |
| 29 | 0.035 | 0.74 | 1.40 | 0.008 | 0.120 | — | — | 0.002 | — | — | — | — |
| 30 | 0.035 | 0.74 | 1.40 | 0.008 | 0.120 | — | — | 0.002 | — | — | — | — |
| 31 | 0.050 | 0.50 | 1.50 | 0.015 | 0.053 | — | — | 0.006 | — | — | — | — |
| 32 | 0.050 | 0.50 | 1.50 | 0.015 | 0.053 | — | — | 0.006 | — | — | — | — |
| 33 | 0.045 | 0.75 | 1.40 | 0.008 | 0.080 | — | — | 0.001 | — | — | — | — |
| 34 | 0.030 | 0.40 | 1.30 | 0.010 | 0.100 | — | — | 0.001 | — | — | — | — |

| No. | La (mass %) | Ce (mass %) | B (mass %) | N (mass %) | O (mass %) | Value calculated from C + (P × 5) (mass %) | Mo (mass %) | Amount of oil (mass %) | Amount of K, Na, Li and Ca on surface (ppm) | Amount of MoS$_2$ on surface (g per wire of 10 kg) | Cu plating |
|---|---|---|---|---|---|---|---|---|---|---|---|
| 1  | — | — | — | 0.0047 | 0.0065 | 0.075 | —    | 0.005 | —    | —    | performed |
| 2  | — | — | — | 0.0047 | 0.0065 | 0.075 | 0.15 | 0.005 | —    | —    | performed |
| 3  | — | — | — | 0.0030 | 0.0020 | 0.125 | —    | 0.010 | —    | —    | performed |
| 4  | — | — | — | 0.0030 | 0.0020 | 0.125 | 0.15 | 0.010 | —    | —    | performed |
| 5  | — | — | — | 0.0047 | 0.0065 | 0.075 | —    | 0.005 | K: 5 | —    | performed |
| 6  | — | — | — | 0.0047 | 0.0065 | 0.075 | 0.15 | 0.005 | K: 5 | —    | performed |
| 7  | — | — | — | 0.0030 | 0.0020 | 0.125 | —    | 0.010 | K: 5 | —    | performed |
| 8  | — | — | — | 0.0030 | 0.0020 | 0.125 | 0.15 | 0.010 | K: 5 | —    | performed |
| 9  | — | — | — | 0.0047 | 0.0065 | 0.075 | —    | 0.005 | —    | 0.10 | performed |
| 10 | — | — | — | 0.0047 | 0.0065 | 0.075 | 0.15 | 0.005 | —    | 0.10 | performed |
| 11 | — | — | — | 0.0030 | 0.0020 | 0.125 | —    | 0.010 | —    | 0.10 | performed |
| 12 | — | — | — | 0.0030 | 0.0020 | 0.125 | 0.15 | 0.010 | —    | 0.10 | performed |
| 13 | — | — | — | 0.0047 | 0.0065 | 0.075 | —    | 0.005 | K: 5 | 0.10 | performed |
| 14 | — | — | — | 0.0047 | 0.0065 | 0.075 | 0.15 | 0.005 | K: 5 | 0.10 | performed |
| 15 | — | — | — | 0.0030 | 0.0020 | 0.125 | —    | 0.010 | K: 5 | 0.10 | performed |
| 16 | — | — | — | 0.0030 | 0.0020 | 0.125 | 0.15 | 0.010 | K: 5 | 0.10 | performed |
| 17 | — | — | — | 0.0047 | 0.0065 | 0.075 | —    | 0.005 | —    | —    | not performed |
| 18 | — | — | — | 0.0047 | 0.0065 | 0.075 | 0.15 | 0.005 | —    | —    | not performed |
| 19 | — | — | — | 0.0030 | 0.0020 | 0.125 | —    | 0.010 | —    | —    | not performed |
| 20 | — | — | — | 0.0030 | 0.0020 | 0.125 | 0.15 | 0.010 | —    | —    | not performed |
| 21 | — | — | — | 0.0047 | 0.0065 | 0.075 | —    | 0.005 | K: 5 | —    | not performed |
| 22 | — | — | — | 0.0047 | 0.0065 | 0.075 | 0.15 | 0.005 | K: 5 | —    | not performed |
| 23 | — | — | — | 0.0030 | 0.0020 | 0.125 | —    | 0.010 | K: 5 | —    | not performed |
| 24 | — | — | — | 0.0030 | 0.0020 | 0.125 | 0.15 | 0.010 | K: 5 | —    | not performed |
| 25 | — | — | — | 0.0047 | 0.0065 | 0.075 | —    | 0.005 | —    | 0.10 | not performed |
| 26 | — | — | — | 0.0047 | 0.0065 | 0.075 | 0.15 | 0.005 | —    | 0.10 | not performed |
| 27 | — | — | — | 0.0030 | 0.0020 | 0.125 | —    | 0.010 | —    | 0.10 | not performed |
| 28 | — | — | — | 0.0030 | 0.0020 | 0.125 | 0.15 | 0.010 | —    | 0.10 | not performed |

TABLE 1-continued

| | | | | | | | | | | | |
|---|---|---|---|---|---|---|---|---|---|---|---|
| 29 | — | — | — | 0.0047 | 0.0065 | 0.075 | — | 0.005 | K: 5 | 0.10 | not performed |
| 30 | — | — | — | 0.0047 | 0.0065 | 0.075 | 0.15 | 0.005 | K: 5 | 0.10 | not performed |
| 31 | — | — | — | 0.0030 | 0.0020 | 0.125 | — | 0.010 | K: 5 | 0.10 | not performed |
| 32 | — | — | — | 0.0030 | 0.0020 | 0.125 | 0.15 | 0.010 | K: 5 | 0.10 | not performed |
| 33 | — | — | — | 0.0030 | 0.0065 | 0.085 | — | 0.005 | — | — | performed |
| 34 | — | — | — | 0.0030 | 0.0065 | 0.080 | — | 0.005 | — | — | performed |

TABLE 2

| No. | C (mass %) | Si (mass %) | Mn (mass %) | P (mass %) | S (mass %) | Cr (mass %) | Ni (mass %) | Al (mass %) | Ti (mass %) | Nb (mass %) | V (mass %) | Zr (mass %) |
|---|---|---|---|---|---|---|---|---|---|---|---|---|
| 35 | 0.060 | 0.90 | 1.62 | 0.011 | 0.195 | — | — | 0.003 | — | — | — | — |
| 36 | 0.060 | 0.90 | 1.62 | 0.011 | 0.195 | — | — | 0.003 | — | — | — | — |
| 37 | 0.020 | 0.28 | 1.15 | 0.005 | 0.080 | — | — | 0.006 | — | — | — | — |
| 38 | 0.065 | 1.00 | 1.30 | 0.014 | 0.056 | 0.20 | — | 0.006 | — | — | — | — |
| 39 | 0.050 | 0.74 | 1.65 | 0.010 | 0.073 | — | 0.20 | 0.040 | — | — | — | — |
| 40 | 0.008 | 0.74 | 1.55 | 0.016 | 0.090 | 0.02 | — | 0.002 | 0.12 | — | — | — |
| 41 | 0.040 | 0.50 | 1.35 | 0.009 | 0.060 | — | — | 0.001 | — | 0.20 | — | — |
| 42 | 0.070 | 0.38 | 1.60 | 0.010 | 0.065 | — | — | 0.003 | 0.005 | — | — | — |
| 43 | 0.035 | 0.75 | 1.25 | 0.008 | 0.060 | — | — | 0.003 | — | — | 0.20 | — |
| 44 | 0.040 | 0.95 | 1.40 | 0.012 | 0.165 | — | 0.02 | 0.003 | — | — | — | 0.10 |
| 45 | 0.068 | 0.80 | 1.25 | 0.009 | 0.050 | — | — | 0.003 | — | — | — | — |
| 46 | 0.070 | 1.20 | 1.35 | 0.013 | 0.050 | 0.05 | — | 0.004 | — | — | — | — |
| 47 | 0.050 | 0.99 | 1.65 | 0.012 | 0.073 | — | 0.05 | 0.008 | — | — | — | — |
| 48 | 0.025 | 0.80 | 1.55 | 0.017 | 0.120 | 0.02 | — | 0.001 | 0.015 | — | — | — |
| 49 | 0.040 | 0.70 | 1.35 | 0.006 | 0.060 | — | — | 0.004 | — | 0.008 | — | — |
| 50 | 0.075 | 0.48 | 1.60 | 0.005 | 0.065 | — | — | 0.020 | 0.005 | — | — | — |
| 51 | 0.035 | 0.75 | 1.30 | 0.004 | 0.080 | — | — | 0.007 | — | — | 0.008 | — |
| 52 | 0.040 | 1.10 | 1.40 | 0.009 | 0.100 | — | 0.02 | 0.007 | — | — | — | 0.008 |
| 53 | 0.050 | 0.80 | 1.25 | 0.011 | 0.050 | — | — | 0.002 | — | — | — | — |
| 54 | 0.020 | 0.80 | 1.40 | 0.010 | 0.070 | 0.04 | 0.04 | 0.007 | 0.050 | 0.008 | 0.005 | 0.008 |
| 55 | 0.050 | 0.75 | 1.63 | 0.016 | 0.085 | — | — | 0.006 | — | — | — | — |
| 56 | 0.050 | 0.75 | 1.63 | 0.016 | 0.085 | — | — | 0.006 | — | — | — | — |
| 57 | 0.050 | 0.40 | 1.17 | 0.010 | 0.057 | — | — | 0.006 | — | — | — | — |
| 58 | 0.050 | 0.70 | 1.17 | 0.010 | 0.057 | — | — | 0.007 | — | — | — | — |
| 59 | 0.050 | 0.70 | 1.17 | 0.010 | 0.057 | — | — | 0.007 | 0.050 | — | — | — |
| 60 | 0.050 | 0.40 | 1.63 | 0.012 | 0.070 | — | — | 0.010 | — | — | — | — |
| 61 | 0.035 | 0.74 | 1.40 | 0.010 | 0.060 | — | — | 0.006 | — | — | — | — |
| 62 | 0.035 | 0.74 | 1.40 | 0.010 | 0.060 | — | — | 0.006 | — | — | — | — |
| 63 | 0.035 | 0.74 | 1.40 | 0.010 | 0.060 | — | — | 0.006 | — | — | — | — |
| 64 | 0.050 | 0.65 | 1.63 | 0.015 | 0.065 | 0.02 | 0.02 | 0.003 | 0.009 | 0.008 | 0.005 | 0.008 |
| 65 | 0.003 | 0.74 | 1.40 | 0.010 | 0.060 | — | — | 0.006 | — | — | — | — |
| 66 | 0.085 | 0.74 | 1.40 | 0.010 | 0.050 | — | — | 0.006 | — | — | — | — |
| 67 | 0.035 | 0.28 | 1.15 | 0.010 | 0.060 | — | — | 0.006 | — | — | — | — |
| 68 | 0.035 | 1.25 | 1.15 | 0.010 | 0.060 | — | — | 0.002 | — | — | — | — |

| No. | La (mass %) | Ce (mass %) | B (mass %) | N (mass %) | O (mass %) | Value calculated from C + (P × 5) (mass %) | Mo (mass %) | Amount of oil (mass %) | Amount of K, Na, Li and Ca on surface (ppm) | Amount of $MoS_2$ on surface (g per wire of 10 kg) | Cu plating |
|---|---|---|---|---|---|---|---|---|---|---|---|
| 35 | — | — | — | 0.0030 | 0.0040 | 0.115 | — | 0.010 | K: 5 | — | performed |
| 36 | — | — | — | 0.0030 | 0.0040 | 0.115 | — | 0.010 | K: 5 | 0.10 | not performed |
| 37 | — | — | — | 0.0015 | 0.0015 | 0.045 | — | 0.012 | Na: 5 | — | performed |
| 38 | — | — | — | 0.0040 | 0.0033 | 0.135 | 0.05 | 0.001 | — | — | performed |
| 39 | — | — | — | 0.0042 | 0.0010 | 0.100 | 0.10 | 0.001 | Ca: 2, Na: 1 | 0.01 | performed |
| 40 | — | — | — | 0.0050 | 0.0043 | 0.088 | — | 0.003 | Li: 5 | 0.90 | performed |
| 41 | — | — | — | 0.0035 | 0.0045 | 0.085 | 0.29 | 0.007 | — | 0.50 | not performed |
| 42 | — | — | 0.0050 | 0.0020 | 0.0020 | 0.120 | — | 0.007 | K; 10, Na: 10, Li: 10 | — | performed |
| 43 | — | — | 0.0005 | 0.0034 | 0.0035 | 0.075 | 0.20 | 0.007 | K: 0.5 | — | performed |
| 44 | — | — | — | 0.0025 | 0.0044 | 0.100 | 0.01 | 0.007 | Na: 0.5 | 0.05 | not performed |
| 45 | 0.15 | 0.15 | — | 0.0020 | 0.0040 | 0.113 | — | 0.007 | — | — | performed |
| 46 | — | — | — | 0.0040 | 0.0040 | 0.135 | 0.05 | 0.007 | — | — | performed |
| 47 | — | — | — | 0.0010 | 0.0044 | 0.110 | 0.10 | 0.007 | Ca: 2, Na: 1 | 0.01 | performed |
| 48 | — | — | — | 0.0030 | 0.0070 | 0.110 | — | 0.007 | Li: 5 | 0.90 | performed |
| 49 | — | — | — | 0.0025 | 0.0020 | 0.070 | 0.29 | 0.007 | — | 0.50 | not performed |
| 50 | — | — | 0.0028 | 0.0035 | 0.0015 | 0.100 | — | 0.007 | K; 10, Na: 10 Li: 10 | — | performed |
| 51 | — | — | 0.0005 | 0.0045 | 0.0035 | 0.055 | 0.20 | 0.007 | K: 0.5 | — | performed |
| 52 | — | — | — | 0.0040 | 0.0030 | 0.085 | 0.01 | 0.007 | Na: 0.5 | 0.05 | not performed |
| 53 | 0.007 | 0.007 | — | 0.0020 | 0.0025 | 0.105 | — | 0.007 | — | — | performed |
| 54 | 0.005 | 0.005 | 0.0025 | 0.0035 | 0.0035 | 0.070 | — | 0.007 | — | — | performed |

TABLE 2-continued

| No. | | | | P | S | | | | K/Na/Li/Ca | MoS2 | Cu plating |
|---|---|---|---|---|---|---|---|---|---|---|---|
| 55 | — | — | — | 0.0044 | 0.0040 | 0.130 | — | 0.007 | K: 24 | — | performed |
| 56 | — | — | — | 0.0044 | 0.0040 | 0.130 | — | 0.007 | K: 2 | 0.05 | not performed |
| 57 | — | — | — | 0.0040 | 0.0040 | 0.100 | — | 0.007 | — | — | performed |
| 58 | — | — | — | 0.0040 | 0.0040 | 0.100 | — | 0.007 | — | — | performed |
| 59 | — | — | — | 0.0040 | 0.0040 | 0.100 | — | 0.007 | — | — | performed |
| 60 | — | — | — | 0.0040 | 0.0015 | 0.110 | — | 0.007 | — | — | performed |
| 61 | — | — | — | 0.0025 | 0.0030 | 0.085 | — | 0.007 | K: 32 | 0.10 | performed |
| 62 | — | — | — | 0.0025 | 0.0030 | 0.085 | — | 0.007 | Ca: 5, Na: 20, K: 7 | 0.10 | performed |
| 63 | — | — | — | 0.0025 | 0.0030 | 0.085 | — | 0.007 | K: 5 | 1.10 | not performed |
| 64 | 0.001 | 0.001 | 0.0006 | 0.0025 | 0.0030 | 0.125 | 0.15 | 0.007 | — | 1.10 | performed |
| 65 | — | — | — | 0.0025 | 0.0045 | 0.053 | — | 0.008 | K: 5 | 0.10 | performed |
| 66 | — | — | — | 0.0025 | 0.0045 | 0.135 | — | 0.008 | K: 5 | 0.10 | performed |
| 67 | — | — | — | 0.0025 | 0.0045 | 0.085 | — | 0.003 | K: 5 | 0.10 | performed |
| 68 | — | — | — | 0.0025 | 0.0045 | 0.085 | — | 0.003 | K: 5 | 0.10 | performed |

TABLE 3

| No. | C (mass %) | Si (mass %) | Mn (mass %) | P (mass %) | S (mass %) | Cr (mass %) | Ni (mass %) | Al (mass %) | Ti (mass %) | Nb (mass %) | V (mass %) | Zr (mass %) |
|---|---|---|---|---|---|---|---|---|---|---|---|---|
| 69 | 0.035 | 0.62 | 1.13 | 0.010 | 0.060 | — | — | 0.010 | — | — | — | — |
| 70 | 0.030 | 0.75 | 0.95 | 0.013 | 0.095 | — | — | 0.002 | — | — | — | — |
| 71 | 0.040 | 0.90 | 1.67 | 0.008 | 0.060 | — | — | 0.015 | — | — | — | — |
| 72 | 0.040 | 0.95 | 1.80 | 0.014 | 0.100 | — | — | 0.003 | — | — | — | — |
| 73 | 0.020 | 0.74 | 1.40 | 0.018 | 0.060 | — | — | 0.011 | — | — | — | — |
| 74 | 0.020 | 0.85 | 1.35 | 0.040 | 0.050 | — | — | 0.003 | — | — | — | — |
| 75 | 0.035 | 0.74 | 1.40 | 0.010 | 0.047 | — | — | 0.008 | — | — | — | — |
| 76 | 0.035 | 0.74 | 1.40 | 0.010 | 0.210 | — | — | 0.007 | — | — | — | — |
| 77 | 0.100 | 1.40 | 1.50 | 0.005 | 0.250 | — | — | 0.004 | — | — | — | — |
| 78 | 0.050 | 0.74 | 1.40 | 0.017 | 0.060 | — | — | 0.006 | — | — | — | — |
| 79 | 0.040 | 0.74 | 1.40 | 0.016 | 0.100 | 0.02 | 0.02 | 0.005 | 0.005 | — | — | — |
| 80 | 0.060 | 0.40 | 1.25 | 0.016 | 0.050 | — | — | 0.007 | — | — | — | — |
| 81 | 0.035 | 0.74 | 1.40 | 0.010 | 0.060 | 0.21 | — | 0.003 | — | — | — | — |
| 82 | 0.035 | 0.74 | 1.40 | 0.010 | 0.060 | — | 0.21 | 0.008 | — | — | — | — |
| 83 | 0.035 | 0.74 | 1.40 | 0.010 | 0.060 | — | — | 0.050 | — | — | — | — |
| 84 | 0.035 | 0.74 | 1.40 | 0.010 | 0.060 | — | — | 0.008 | 0.16 | — | — | — |
| 85 | 0.035 | 0.74 | 1.40 | 0.010 | 0.060 | — | — | 0.005 | — | 0.21 | — | — |
| 86 | 0.035 | 0.74 | 1.40 | 0.010 | 0.060 | — | — | 0.005 | — | — | 0.21 | — |
| 87 | 0.035 | 0.74 | 1.40 | 0.010 | 0.060 | — | — | 0.005 | — | — | — | 0.11 |
| 88 | 0.035 | 0.74 | 1.40 | 0.010 | 0.060 | — | — | 0.009 | — | — | — | — |
| 89 | 0.035 | 0.74 | 1.40 | 0.010 | 0.060 | — | — | 0.006 | — | — | — | — |
| 90 | 0.035 | 0.74 | 1.40 | 0.010 | 0.060 | — | — | 0.006 | — | — | — | — |
| 91 | 0.035 | 0.74 | 1.40 | 0.010 | 0.060 | — | — | 0.006 | — | — | — | — |
| 92 | 0.035 | 0.74 | 1.40 | 0.010 | 0.060 | — | — | 0.006 | — | — | — | — |
| 93 | 0.035 | 0.74 | 1.40 | 0.012 | 0.110 | — | — | 0.006 | — | — | — | — |
| 94 | 0.035 | 0.74 | 1.40 | 0.010 | 0.060 | — | — | 0.006 | — | — | — | — |
| 95 | 0.050 | 0.23 | 1.25 | 0.022 | 0.018 | — | — | 0.006 | 0.08 | — | — | — |
| 96 | 0.090 | 0.75 | 1.85 | 0.010 | 0.002 | 0.20 | — | 0.012 | 0.15 | — | — | — |
| 97 | 0.060 | 0.90 | 1.45 | 0.010 | 0.075 | — | — | 0.002 | — | — | — | — |
| 98 | 0.070 | 0.65 | 1.50 | 0.006 | 0.057 | — | — | 0.005 | — | — | — | — |
| 99 | 0.030 | 0.45 | 1.35 | 0.007 | 0.120 | — | — | 0.002 | — | 0.005 | — | — |
| 100 | 0.050 | 1.00 | 1.35 | 0.005 | 0.035 | 0.01 | — | 0.003 | — | — | — | — |
| 101 | 0.079 | 0.70 | 1.25 | 0.012 | 0.100 | — | — | 0.008 | — | — | — | — |

| No. | La (mass %) | Ce (mass %) | B (mass %) | N (mass %) | O (mass %) | Value calculated from C + (P × 5) (mass %) | Mo (mass %) | Amount of oil (mass %) | Amount of K, Na, Li and Ca on surface | Amount of MoS2 on surface (g per wire of 10 kg) | Cu plating |
|---|---|---|---|---|---|---|---|---|---|---|---|
| 69 | — | — | — | 0.0025 | 0.0045 | 0.085 | — | 0.004 | K: 5 | 0.10 | performed |
| 70 | — | — | — | 0.0020 | 0.0030 | 0.095 | — | 0.004 | — | — | performed |
| 71 | — | — | — | 0.0025 | 0.0045 | 0.080 | — | 0.005 | K: 5 | 0.10 | performed |
| 72 | — | — | — | 0.0070 | 0.0035 | 0.110 | — | 0.005 | — | — | performed |
| 73 | — | — | — | 0.0025 | 0.0045 | 0.110 | — | 0.01 | K: 5 | 0.10 | performed |
| 74 | — | — | — | 0.0040 | 0.0035 | 0.220 | — | 0.01 | — | — | performed |
| 75 | — | — | — | 0.0045 | 0.0025 | 0.085 | — | 0.009 | K: 5 | 0.10 | performed |
| 76 | — | — | — | 0.0025 | 0.0040 | 0.085 | — | 0.009 | K: 5 | 0.10 | performed |
| 77 | — | — | — | 0.0040 | 0.0030 | 0.125 | — | 0.008 | — | — | performed |
| 78 | — | — | — | 0.0045 | 0.0045 | 0.135 | — | 0.013 | K: 5 | 0.10 | performed |
| 79 | — | — | — | 0.0050 | 0.0049 | 0.120 | — | 0.020 | — | — | not performed |
| 80 | 0.007 | — | — | 0.0045 | 0.0050 | 0.140 | 0.25 | 0.005 | Li: 0.9 | 0.50 | performed |
| 81 | — | — | — | 0.0025 | 0.0045 | 0.085 | — | 0.005 | K: 5 | 0.10 | performed |
| 82 | — | — | — | 0.0025 | 0.0045 | 0.085 | — | 0.005 | K: 5 | 0.10 | performed |

TABLE 3-continued

| | | | | | | | | | | | |
|---|---|---|---|---|---|---|---|---|---|---|---|
| 83 | — | — | — | 0.0025 | 0.0045 | 0.085 | — | 0.005 | K: 5 | 0.10 | performed |
| 84 | — | — | — | 0.0025 | 0.0045 | 0.085 | — | 0.005 | K: 5 | 0.10 | performed |
| 85 | — | — | — | 0.0025 | 0.0045 | 0.085 | — | 0.005 | K: 5 | 0.10 | performed |
| 86 | — | — | — | 0.0025 | 0.0045 | 0.085 | — | 0.005 | K: 5 | 0.10 | performed |
| 87 | — | — | — | 0.0025 | 0.0045 | 0.085 | — | 0.005 | K: 5 | 0.10 | performed |
| 88 | 0.21 | — | — | 0.0025 | 0.0045 | 0.085 | — | 0.005 | K: 5 | 0.10 | performed |
| 89 | — | 0.21 | — | 0.0025 | 0.0045 | 0.085 | — | 0.005 | K: 5 | 0.10 | performed |
| 90 | — | — | 0.0055 | 0.0025 | 0.0045 | 0.085 | — | 0.005 | K: 5 | 0.10 | performed |
| 91 | — | — | — | 0.0060 | 0.0025 | 0.085 | — | 0.005 | K: 5 | 0.10 | performed |
| 92 | — | — | — | 0.0045 | 0.0120 | 0.085 | — | 0.005 | K: 5 | 0.10 | performed |
| 93 | — | — | — | 0.0030 | 0.0075 | 0.095 | — | 0.005 | — | — | not performed |
| 94 | — | — | — | 0.0025 | 0.0045 | 0.085 | 0.35 | 0.008 | K: 5 | 0.10 | performed |
| 95 | — | — | — | 0.0050 | 0.0020 | 0.160 | — | 0.015 | — | — | performed |
| 96 | — | — | 0.0060 | 0.0020 | 0.0020 | 0.140 | 0.32 | 0.025 | — | — | performed |
| 97 | — | — | — | 0.0060 | 0.0080 | 0.110 | — | 0.014 | — | — | performed |
| 98 | — | — | — | 0.0040 | 0.0080 | 0.100 | — | 0.018 | — | — | performed |
| 99 | — | — | — | 0.0030 | 0.0030 | 0.065 | 0.05 | 0.017 | — | — | not performed |
| 100 | — | — | — | 0.0030 | 0.0030 | 0.075 | — | 0.001 | K: 5 | 0.10 | not performed |
| 101 | — | — | — | 0.0030 | 0.0030 | 0.139 | — | 0.002 | — | 0.10 | performed |

(1) Burn-Through Resistance

Figure 4:
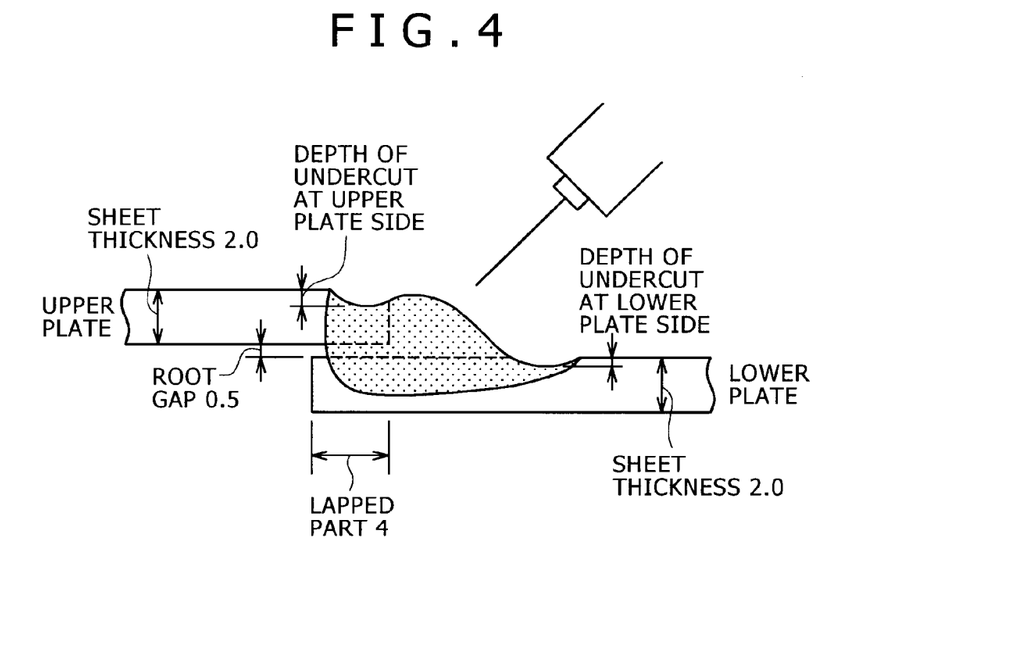
FIG. 4 is a diagram for explaining a lap fillet welding test, and explaining definition of depth of undercut.

FIG. 4 is a diagram for explaining a lap fillet welding test, and explaining definition of depth of undercut.

As shown in FIG. 4, carbon steel sheets 2.0 mm in thickness and 520 MPa in tensile strength were set into a lap joint with a root gap of 0.5 mm and a lapped part of 4 mm, then subjected to lap welding at welding speed of 80 cm/min in a horizontal position. At that time, a composition of shielding gas was Ar 80% and $Co_2$ 20%, polarity was minus at base metal, and extension of the solid wire was 15 mm. A current was changed by 5 A, and a feed rate of the solid wire at a maximum value of a current at which the burn through did not occur was assumed as a critical feed rate (m/min) and used for evaluation of the burn-through resistance. Here, the reason why the burn-through resistance was not evaluated using a current value is that a relationship between the current value and the feed rate is changed depending on a composition of the solid wire. A voltage value was adjusted every time when the current value was changed so that a value at which arc was determined to be most stable (optimally determinate value) was used. According to this, when the deposited amount is constant, penetration becomes shallower as the critical feed rate is increased, therefore excellent burn-through resistance is given.

In evaluation of the burn-through resistance, a sample with a critical feed rate of 5.60 m/min or more and less than 6.50 m/min was evaluated to be good (circle), and a sample with a critical feed rate of 6.50 m/min or more was evaluated to be excellent (double circle). On the contrary, a sample with a critical feed rate of less than 5.60 m/min was evaluated to be not-good (cross). It was determined that the sample being good (circle) and the sample being excellent (double circle) were acceptable, and the sample being not-good (cross) was rejectable.

(2) Undercut Resistance

Receiving results of the test (1), when welding was performed in setting of a current value of ((current value at the critical feed rate) minus 30 A), and a voltage value of ((optimally determinate value) plus 2 V), a sectional macro photograph (magnification of ×10) of a bead was taken, and depth of undercut in a welding toe portion was measured from such a sectional macro photograph (which is shown as "depth of undercut (mm)" in Tables 4 to 6). As shown in FIG. 4, both of depth at an upper plate side and depth at a lower plate side were measured, and a maximum value of the depth was determined as an evaluated value.

In evaluation of the undercut resistance, a sample with the maximum value of more than 0.30 mm and 0.50 mm or less was evaluated to be good (circle), and a sample with the maximum value of 0.30 mm or less was evaluated to be excellent (double circle). On the contrary, a sample with the maximum value of more than 0.50 mm was evaluated to be not-good (cross). It was determined that the sample being good (circle) and the sample being excellent (double circle) were acceptable, and the sample being not-good (cross) was rejectable.

(3) Hardness of Weld Metal

Receiving the results of the test (1), when welding was performed in setting of a current value of ((current value at the critical feed rate) minus 10 A), Vickers hardness (load 1 kgf (9.8N)) of a sectionally central portion of weld metal of a lap joint was measured at three points, and an average value was determined as hardness (HV) of the weld metal.

In evaluation of the hardness of weld metal, a sample with Vickers hardness of 160 HV or more was evaluated to be good (circle) on general view that hardness equal to or higher than that of base metal is good, and a sample with Vickers hardness of less than 160 HV was evaluated to be not-good (cross). It was determined that the sample being good (circle) was acceptable, and the sample being not-good (cross) was rejectable.

(4) Crack Resistance

Receiving the results of the test (1), welding was performed ten times in welding length of 100 mm with the current value at the critical feed rate, and all welds were subjected to an X-ray transmission test. Results are shown as "Crack" in Tables 4 to 6.

In evaluation of the crack resistance, a sample being sound with a crack being not found was evaluated as "not found" (good), and a sample with a crack being found was evaluated as "found" (not-good). It was determined that the sample being good was acceptable, and the sample being not-good was rejectable.

Figure 5:
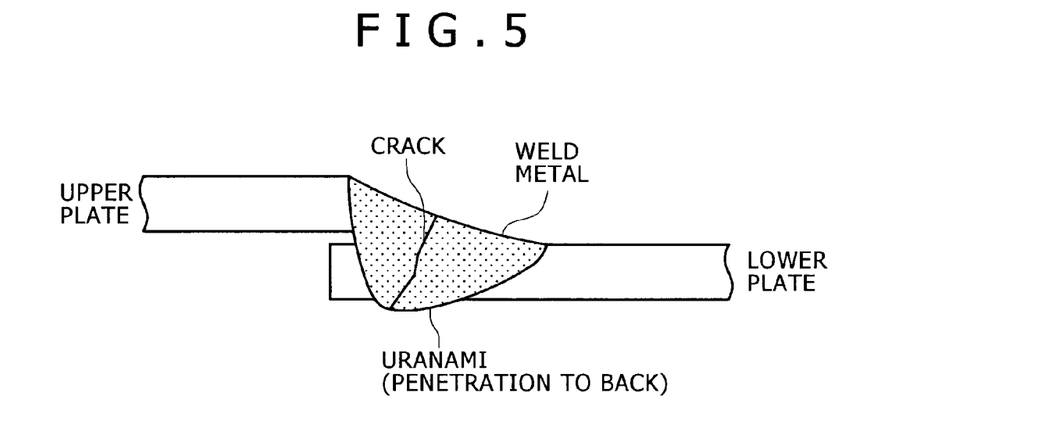
FIG. 5 is a diagram for explaining a crack to be an evaluation object in evaluation of crack resistance.

All samples in which a crack was found were investigated, as a result, crack morphology was recognized as a longitudinal crack in an approximately central portion of bead width as shown in FIG. 5. Moreover, as a result of fracture observation, the hot crack was recognized as solidification crack. FIG. 5 is a diagram for explaining a crack to be an evaluation object in evaluation of the crack resistance.

(5) Spatter Generation

Welding was performed in bead-on-plate welding at a current of 200 A and a voltage that was set using enlarged projection near arc such that arc length was 2 mm, and produced spatter was collected by a collector box and measured in weight.

In evaluation of the spatter generation, a sample with spatter generation of more than 1.30 g/min and 1.50 g/min or less was evaluated to be good (circle), and a sample with spatter generation of 1.30 g/min or less was evaluated to be excellent (double circle). On the contrary, a sample with the spatter generation of more than 1.50 g/min was evaluated to be not-good (cross). It was determined that the sample being good (circle) and the sample being excellent (double circle) were acceptable, and the sample being not-good (cross) was rejectable.

(6) Feed Stability

Welding was performed for 1 hr in bead-on-plate welding at a feed rate of a solid wire of 6.00 m/min and a voltage at which arc length was 2 mm, and stability was sensorily evaluated.

In evaluation of the feed stability, a sample in which a feed rate was completely not varied was evaluated to be excellent (double circle), and a sample in which a feed rate was practically not problematic while it was slightly varied was evaluated to be good (circle). On the contrary, a sample in which a feed rate was frequently varied, so that arc was unstable and determined to be unavailable for use was evaluated to be not-good (cross). It was determined that the sample being excellent (double circle) and the sample being good (circle) were acceptable, and the sample being not-good (cross) was rejectable.

An area ratio of slag produced on a bead was measured in order to evaluate possibility of separation of coating by (7) Encapsulation Ratio of Slug detachment of slag in electro deposition coating performed after welding.

In evaluation of the encapsulation ratio of slug, a case that a ratio of the total area of slag to surface area of a bead was 4.0% or less was evaluated to be excellent (double circle), and a case that the ratio was more than 4.0% and 5.0% or less was evaluated to be good (circle). On the contrary, a case that such a ratio was more than 5.0% was evaluated to be not-good (cross). It was determined that a sample being excellent (double circle) and a sample being good (circle) were acceptable, and a sample being not-good (cross) was rejectable.

(8) Charpy Absorbed Energy

Charpy absorbed energy was measured according to JIS Z 3312 "MAG welding solid wire for mild steel and high strength steel" to conveniently evaluate impact resistance of a welded part, that is, conveniently evaluate whether weld metal in a welded part was embrittled or not. Three samples were tested at test temperature of 0° C., and an average value was provided for evaluation.

In evaluation of the Charpy absorbed energy, a sample with Charpy absorbed energy of 70 J or more was evaluated to be excellent (double circle), and a sample with Charpy absorbed energy of 27 J or more and less than 70 J was evaluated to be good (circle). On the contrary, a sample with Charpy absorbed energy of less than 27 J was determined to be embrittled metal, and evaluated to be not-good (cross). It was determined that the sample being good (circle) and the sample being excellent (double circle) were acceptable, and the sample being not-good (cross) was rejectable.

Evaluation results on the evaluation items (1) to (8) are shown in Tables 4 to 6.

TABLE 4

| No. | Critical current (A) | Depth of undercut (mm) | | Hardness (HV) | | Crack | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|---|
| 1 | 240 | 0.20 | ◎ | 174 | ○ | not found | 1.38 | ○ | ○ | 2.5 | ◎ | 65 | ○ | 7.49 | ◎ | Example |
| 2 | 240 | 0.25 | ◎ | 181 | ○ | not found | 1.41 | ○ | ○ | 2.7 | ◎ | 68 | ○ | 7.49 | ◎ | Example |
| 3 | 220 | 0.25 | ◎ | 172 | ○ | not found | 1.08 | ◎ | ○ | 3.0 | ◎ | 100 | ◎ | 6.58 | ◎ | Example |
| 4 | 220 | 0.30 | ◎ | 179 | ○ | not found | 1.16 | ◎ | ○ | 3.2 | ◎ | 105 | ◎ | 6.58 | ◎ | Example |
| 5 | 245 | 0.15 | ◎ | 174 | ○ | not found | 1.37 | ○ | ○ | 2.5 | ◎ | 63 | ○ | 7.71 | ◎ | Example |
| 6 | 245 | 0.20 | ◎ | 181 | ○ | not found | 1.40 | ○ | ○ | 2.7 | ◎ | 65 | ○ | 7.71 | ◎ | Example |
| 7 | 225 | 0.20 | ◎ | 172 | ○ | not found | 1.03 | ◎ | ○ | 3.0 | ◎ | 101 | ◎ | 6.81 | ◎ | Example |
| 8 | 225 | 0.25 | ◎ | 172 | ○ | not found | 1.04 | ◎ | ○ | 3.2 | ◎ | 106 | ◎ | 6.81 | ◎ | Example |
| 9 | 250 | 0.10 | ◎ | 174 | ○ | not found | 1.37 | ○ | ◎ | 2.5 | ◎ | 66 | ○ | 7.94 | ◎ | Example |
| 10 | 250 | 0.15 | ◎ | 181 | ○ | not found | 1.40 | ○ | ◎ | 2.7 | ◎ | 67 | ○ | 7.94 | ◎ | Example |
| 11 | 225 | 0.15 | ◎ | 172 | ○ | not found | 0.96 | ◎ | ◎ | 3.0 | ◎ | 102 | ◎ | 6.81 | ◎ | Example |
| 12 | 225 | 0.20 | ◎ | 179 | ○ | not found | 1.09 | ◎ | ◎ | 3.2 | ◎ | 107 | ◎ | 6.81 | ◎ | Example |
| 13 | 250 | 0.05 | ◎ | 174 | ○ | not found | 1.35 | ○ | ◎ | 2.5 | ◎ | 66 | ○ | 7.94 | ◎ | Example |
| 14 | 250 | 0.10 | ◎ | 181 | ○ | not found | 1.38 | ○ | ◎ | 2.7 | ◎ | 64 | ○ | 7.94 | ◎ | Example |
| 15 | 220 | 0.10 | ◎ | 172 | ○ | not found | 0.91 | ◎ | ◎ | 3.0 | ◎ | 103 | ◎ | 6.58 | ◎ | Example |
| 16 | 220 | 0.15 | ◎ | 179 | ○ | not found | 0.99 | ◎ | ◎ | 3.2 | ◎ | 108 | ◎ | 6.58 | ◎ | Example |
| 17 | 250 | 0.15 | ◎ | 174 | ○ | not found | 1.36 | ○ | ○ | 2.7 | ◎ | 63 | ○ | 7.94 | ◎ | Example |
| 18 | 250 | 0.20 | ◎ | 181 | ○ | not found | 1.39 | ○ | ○ | 2.9 | ◎ | 64 | ○ | 7.94 | ◎ | Example |
| 19 | 225 | 0.20 | ◎ | 172 | ○ | not found | 1.01 | ◎ | ○ | 3.2 | ◎ | 98 | ◎ | 6.81 | ◎ | Example |
| 20 | 225 | 0.25 | ◎ | 179 | ○ | not found | 1.06 | ◎ | ○ | 3.4 | ◎ | 103 | ◎ | 6.81 | ◎ | Example |
| 21 | 255 | 0.10 | ◎ | 174 | ○ | not found | 1.34 | ○ | ○ | 2.7 | ◎ | 64 | ○ | 8.17 | ◎ | Example |
| 22 | 255 | 0.15 | ◎ | 181 | ○ | not found | 1.37 | ○ | ○ | 2.9 | ◎ | 65 | ○ | 8.17 | ◎ | Example |
| 23 | 230 | 0.15 | ◎ | 172 | ○ | not found | 0.85 | ◎ | ○ | 3.2 | ◎ | 99 | ◎ | 7.03 | ◎ | Example |
| 24 | 230 | 0.20 | ◎ | 172 | ○ | not found | 0.94 | ◎ | ○ | 3.4 | ◎ | 104 | ◎ | 7.03 | ◎ | Example |
| 25 | 255 | 0.05 | ◎ | 174 | ○ | not found | 1.34 | ○ | ◎ | 2.7 | ◎ | 66 | ○ | 8.17 | ◎ | Example |
| 26 | 255 | 0.10 | ◎ | 181 | ○ | not found | 1.37 | ○ | ◎ | 2.9 | ◎ | 68 | ○ | 8.17 | ◎ | Example |
| 27 | 230 | 0.10 | ◎ | 172 | ○ | not found | 0.85 | ◎ | ◎ | 3.2 | ◎ | 100 | ◎ | 7.03 | ◎ | Example |
| 28 | 230 | 0.15 | ◎ | 179 | ○ | not found | 0.94 | ◎ | ◎ | 3.4 | ◎ | 105 | ◎ | 7.03 | ◎ | Example |
| 29 | 260 | 0 | ◎ | 174 | ○ | not found | 1.30 | ○ | ○ | 2.7 | ◎ | 65 | ○ | 8.39 | ◎ | Example |
| 30 | 260 | 0.05 | ◎ | 181 | ○ | not found | 1.33 | ○ | ○ | 2.9 | ◎ | 67 | ○ | 8.39 | ◎ | Example |
| 31 | 240 | 0.05 | ◎ | 172 | ○ | not found | 0.80 | ◎ | ◎ | 3.2 | ◎ | 101 | ◎ | 7.49 | ◎ | Example |
| 32 | 240 | 0.10 | ◎ | 179 | ○ | not found | 0.89 | ◎ | ◎ | 3.4 | ◎ | 106 | ◎ | 7.49 | ◎ | Example |
| 33 | 245 | 0.20 | ◎ | 176 | ○ | not found | 1.20 | ◎ | ○ | 2.7 | ◎ | 69 | ○ | 7.71 | ◎ | Example |
| 34 | 245 | 0.15 | ◎ | 165 | ○ | not found | 1.35 | ○ | ○ | 2.6 | ◎ | 47 | ○ | 7.71 | ◎ | Example |

TABLE 5

| No. | Critical current (A) | Depth of undercut (mm) | | Hardness (HV) | | Crack | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|---|
| 35 | 205 | 0.35 | ○ | 182 | ○ | not found | 1.40 | ○ | ○ | 4.1 | ○ | 40 | ○ | 5.90 | ○ | Example |
| 36 | 215 | 0.30 | ⊚ | 182 | ○ | not found | 1.35 | ○ | ⊚ | 4.3 | ○ | 40 | ○ | 6.35 | ○ | Example |
| 37 | 205 | 0.40 | ○ | 161 | ○ | not found | 0.99 | ⊚ | ○ | 2.7 | ⊚ | 76 | ⊚ | 5.90 | ○ | Example |
| 38 | 200 | 0.50 | ○ | 175 | ○ | not found | 1.45 | ○ | ⊚ | 4.5 | ○ | 80 | ⊚ | 5.67 | ○ | Example |
| 39 | 215 | 0.50 | ○ | 184 | ○ | not found | 1.42 | ○ | ⊚ | 4.7 | ○ | 60 | ○ | 6.35 | ○ | Example |
| 40 | 230 | 0.35 | ○ | 196 | ○ | not found | 1.44 | ○ | ⊚ | 4.7 | ○ | 80 | ⊚ | 7.03 | ⊚ | Example |
| 41 | 215 | 0.45 | ○ | 208 | ○ | not found | 1.43 | ○ | ⊚ | 4.2 | ○ | 49 | ○ | 6.35 | ○ | Example |
| 42 | 200 | 0.50 | ○ | 179 | ○ | not found | 1.18 | ⊚ | ○ | 4.1 | ○ | 102 | ⊚ | 5.67 | ○ | Example |
| 43 | 215 | 0.50 | ○ | 190 | ○ | not found | 1.46 | ○ | ⊚ | 4.1 | ○ | 76 | ⊚ | 6.35 | ○ | Example |
| 44 | 210 | 0.50 | ○ | 175 | ○ | not found | 1.45 | ○ | ⊚ | 4.1 | ○ | 60 | ○ | 6.12 | ○ | Example |
| 45 | 220 | 0.50 | ○ | 173 | ○ | not found | 1.42 | ○ | ○ | 4.6 | ○ | 99 | ⊚ | 6.58 | ⊚ | Example |
| 46 | 200 | 0.50 | ○ | 175 | ○ | not found | 1.45 | ○ | ⊚ | 3.4 | ⊚ | 72 | ○ | 5.67 | ○ | Example |
| 47 | 215 | 0.40 | ○ | 184 | ○ | not found | 1.16 | ⊚ | ⊚ | 4.4 | ○ | 102 | ⊚ | 6.35 | ○ | Example |
| 48 | 240 | 0.15 | ⊚ | 196 | ○ | not found | 1.35 | ○ | ⊚ | 2.5 | ⊚ | 66 | ○ | 7.49 | ⊚ | Example |
| 49 | 225 | 0.10 | ⊚ | 208 | ○ | not found | 0.99 | ⊚ | ⊚ | 3.2 | ⊚ | 80 | ⊚ | 6.81 | ⊚ | Example |
| 50 | 200 | 0.50 | ○ | 179 | ○ | not found | 1.48 | ○ | ⊚ | 4.2 | ○ | 95 | ⊚ | 5.67 | ○ | Example |
| 51 | 225 | 0.20 | ⊚ | 190 | ○ | not found | 1.20 | ⊚ | ⊚ | 2.9 | ⊚ | 76 | ⊚ | 6.81 | ⊚ | Example |
| 52 | 240 | 0 | ⊚ | 175 | ○ | not found | 1.32 | ⊚ | ⊚ | 2.7 | ⊚ | 68 | ○ | 7.49 | ⊚ | Example |
| 53 | 220 | 0.25 | ⊚ | 173 | ○ | not found | 1.26 | ⊚ | ⊚ | 3.6 | ⊚ | 90 | ⊚ | 6.58 | ⊚ | Example |
| 54 | 220 | 0.20 | ⊚ | 175 | ○ | not found | 1.29 | ⊚ | ⊚ | 3.8 | ⊚ | 103 | ⊚ | 6.58 | ⊚ | Example |
| 55 | 210 | 0.35 | ○ | 180 | ○ | not found | 0.91 | ⊚ | ⊚ | 4.4 | ○ | 100 | ⊚ | 6.12 | ○ | Example |
| 56 | 215 | 0.30 | ⊚ | 180 | ○ | not found | 0.85 | ⊚ | ○ | 4.5 | ○ | 99 | ⊚ | 6.35 | ○ | Example |
| 57 | 205 | 0.40 | ○ | 170 | ○ | not found | 1.43 | ○ | ⊚ | 2.9 | ⊚ | 75 | ⊚ | 5.90 | ○ | Example |
| 58 | 200 | 0.35 | ○ | 174 | ○ | not found | 1.44 | ○ | ○ | 3.1 | ⊚ | 80 | ⊚ | 5.67 | ○ | Example |
| 59 | 200 | 0.35 | ○ | 176 | ○ | not found | 1.50 | ○ | ○ | 3.3 | ⊚ | 80 | ⊚ | 5.67 | ○ | Example |
| 60 | 200 | 0.45 | ○ | 179 | ○ | not found | 1.42 | ○ | ○ | 4.1 | ○ | 92 | ⊚ | 5.67 | ○ | Example |
| 61 | 225 | 0.10 | ⊚ | 174 | ○ | not found | 1.13 | ⊚ | ⊚ | 2.7 | ⊚ | 78 | ⊚ | 6.81 | ⊚ | Example |
| 62 | 225 | 0.10 | ⊚ | 174 | ○ | not found | 1.40 | ○ | ○ | 2.7 | ⊚ | 80 | ⊚ | 6.81 | ⊚ | Example |
| 63 | 240 | 0 | ⊚ | 174 | ○ | not found | 1.03 | ⊚ | ○ | 2.7 | ⊚ | 78 | ⊚ | 7.49 | ⊚ | Example |
| 64 | 200 | 0.35 | ○ | 182 | ○ | not found | 1.28 | ⊚ | ○ | 4.5 | ○ | 96 | ⊚ | 5.67 | ○ | Example |
| 65 | 225 | 0.10 | ⊚ | 150 | X | not found | 0.84 | ⊚ | ⊚ | 2.5 | ⊚ | 90 | ⊚ | 6.81 | ⊚ | Comparative example |
| 66 | 190 | 0.55 | X | 200 | ○ | found | 1.64 | X | ⊚ | 2.6 | ⊚ | 94 | ⊚ | 5.22 | X | Comparative example |
| 67 | 190 | 0.55 | X | 153 | X | not found | 0.85 | ⊚ | ⊚ | 2.3 | ⊚ | 102 | ⊚ | 5.22 | X | Comparative example |
| 68 | 190 | 0.55 | X | 187 | ○ | not found | 1.10 | ⊚ | ⊚ | 2.9 | ⊚ | 22 | X | 5.22 | X | Comparative example |

TABLE 6

| No. | Critical current (A) | Depth of undercut (mm) | | Hardness (HV) | | Crack | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|---|
| 69 | 190 | 0.55 | X | 156 | X | not found | 0.94 | ⊚ | ⊚ | 2.3 | ⊚ | 23 | X | 5.22 | X | Comparative example |
| 70 | 185 | 0.60 | X | 151 | X | not found | 1.40 | ○ | ○ | 2.2 | ⊚ | 20 | X | 4.99 | X | Comparative example |
| 71 | 190 | 0.55 | X | 182 | ○ | not found | 1.20 | ⊚ | ⊚ | 5.2 | X | 106 | ⊚ | 5.22 | X | Comparative example |
| 72 | 185 | 0.60 | X | 183 | ○ | found | 1.41 | ○ | ○ | 5.9 | X | 20 | X | 4.99 | X | Comparative example |
| 73 | 225 | 0.40 | ○ | 175 | ○ | found | 0.90 | ⊚ | ⊚ | 2.5 | ⊚ | 78 | ⊚ | 6.81 | ⊚ | Comparative example |
| 74 | 225 | 0.42 | ○ | 173 | ○ | found | 1.65 | X | ○ | 3.1 | ⊚ | 22 | X | 6.81 | ⊚ | Comparative example |
| 75 | 190 | 0.55 | X | 175 | ○ | not found | 0.84 | ⊚ | ⊚ | 3.1 | ⊚ | 103 | ⊚ | 5.22 | X | Comparative example |
| 76 | 235 | 0.60 | X | 176 | ○ | found | 1.60 | X | ⊚ | 1.9 | ⊚ | 19 | X | 7.26 | ⊚ | Comparative example |
| 77 | 180 | 0.55 | X | 200 | ○ | found | 1.80 | X | ○ | 3.3 | ⊚ | 8 | X | 4.76 | X | Comparative example |
| 78 | 195 | 0.55 | X | 180 | ○ | found | 1.11 | ⊚ | ⊚ | 2.7 | ⊚ | 76 | ⊚ | 5.44 | X | Comparative example |
| 79 | 190 | 0.60 | X | 179 | ○ | found | 1.44 | ○ | ⊚ | 3.5 | ⊚ | 45 | ○ | 5.22 | X | Comparative example |
| 80 | 220 | 0.35 | ○ | 206 | ○ | found | 1.19 | ⊚ | ⊚ | 3.5 | ⊚ | 80 | ⊚ | 6.58 | ⊚ | Comparative example |
| 81 | 190 | 0.55 | X | 179 | ○ | not found | 1.54 | X | ⊚ | 5.1 | X | 73 | ⊚ | 5.22 | X | Comparative example |
| 82 | 190 | 0.55 | X | 179 | ○ | not found | 1.53 | X | ⊚ | 3.4 | ⊚ | 106 | ⊚ | 5.22 | X | Comparative example |

TABLE 6-continued

| No. | Critical current (A) | Depth of undercut (mm) | | Hardness (HV) | | Crack | Amount of spatter (g/min) | | Feed stability | Encapsulation ratio of slag (%) | | Absorbed energy (J) | | Critical feed rate (m/min) | | Remarks |
|---|---|---|---|---|---|---|---|---|---|---|---|---|---|---|---|---|
| 83 | 190 | 0.55 | X | 176 | ○ | not found | 1.60 | X | ◎ | 5.1 | X | 54 | ○ | 5.22 | X | Comparative example |
| 84 | 190 | 0.55 | X | 178 | ○ | not found | 1.52 | X | ◎ | 5.2 | X | 100 | ◎ | 5.22 | X | Comparative example |
| 85 | 190 | 0.55 | X | 182 | ○ | not found | 1.58 | X | ◎ | 5.2 | X | 56 | ○ | 5.22 | X | Comparative example |
| 86 | 190 | 0.55 | X | 182 | ○ | not found | 1.60 | X | ◎ | 5.1 | X | 56 | ○ | 5.22 | X | Comparative example |
| 87 | 190 | 0.55 | X | 176 | ○ | not found | 1.58 | X | ◎ | 5.2 | X | 90 | ◎ | 5.22 | X | Comparative example |
| 88 | 190 | 0.55 | X | 175 | ○ | not found | 1.53 | X | ◎ | 5.2 | X | 76 | ◎ | 5.22 | X | Comparative example |
| 89 | 190 | 0.55 | X | 175 | ○ | not found | 1.53 | X | ◎ | 5.2 | X | 74 | ◎ | 5.22 | X | Comparative example |
| 90 | 225 | 0.25 | ◎ | 180 | ○ | found | 1.01 | ◎ | ◎ | 2.8 | ◎ | 105 | ◎ | 6.81 | ◎ | Comparative example |
| 91 | 225 | 0.60 | X | 185 | ○ | found | 1.28 | ◎ | ◎ | 3.3 | ◎ | 25 | X | 6.81 | ◎ | Comparative example |
| 92 | 230 | 0.60 | X | 168 | ○ | found | 1.15 | ◎ | ◎ | 5.5 | X | 76 | ◎ | 7.03 | ◎ | Comparative example |
| 93 | 230 | 0.60 | X | 165 | ○ | found | 1.33 | ○ | ○ | 5.3 | X | 55 | ○ | 7.13 | ◎ | Comparative example |
| 94 | 190 | 0.55 | X | 220 | ○ | not found | 1.55 | X | ◎ | 3.4 | ◎ | 80 | ◎ | 5.22 | X | Comparative example |
| 95 | 180 | 0.60 | X | 156 | X | found | 1.20 | ◎ | ○ | 4.5 | ○ | 50 | ○ | 4.76 | X | Comparative example |
| 96 | 175 | 0.70 | X | 237 | ○ | found | 1.90 | X | ○ | 10.5 | X | 156 | ◎ | 4.54 | X | Comparative example |
| 97 | 190 | 0.60 | X | 178 | ○ | found | 1.40 | ○ | ○ | 5.7 | X | 21 | X | 5.22 | X | Comparative example |
| 98 | 195 | 0.55 | X | 185 | ○ | found | 1.35 | ○ | ○ | 5.9 | X | 45 | ○ | 5.44 | X | Comparative example |
| 99 | 190 | 0.55 | X | 175 | ○ | found | 1.25 | ○ | ○ | 3.1 | ◎ | 65 | ○ | 5.22 | X | Comparative example |
| 100 | 180 | 0.65 | X | 192 | ○ | not found | 1.00 | ◎ | ◎ | 3.5 | ◎ | 100 | ◎ | 4.76 | X | Comparative example |
| 101 | 220 | 0.35 | ○ | 165 | ○ | found | 1.09 | ◎ | ◎ | 2.7 | ◎ | 88 | ◎ | 6.58 | ◎ | Comparative example |

In Nos. 1 to 64, since compositions of solid wires satisfied the requirements of an embodiment of the invention, good evaluation results were able to be obtained in all the evaluation items of the critical feed rate (burn-through resistance), undercut resistance, hardness of weld metal, spatter generation, feed stability of solid wire, encapsulation ratio of slug, and Charpy absorbed energy (impact resistance) (examples; see columns of remarks of Tables 4, 5 and 6).

On the other hand, in Nos. 65 to 101, since compositions of solid wires did not satisfy the requirements of an embodiment of the invention, evaluation results were obtained, in which a not-good result was obtained in one of the evaluation items (comparative examples; see columns of remarks of Tables 5 and 6). This is specifically described as follows.

In No. 65, since the content of C was excessively low, hardness was insufficient. That is, a welded part of weld metal was insufficient in strength, and not available for general purpose.

In No. 66, since the content of C was excessively high, deoxidization was excessive, so that the burn-through resistance and the undercut resistance were not good, in addition, the amount of spatter was large. Moreover, solidification crack occurred.

In No. 67, since the content of Si was excessively low, hardness of weld metal was insufficient. That is, a welded part was insufficient in strength, and not available for general purpose. Moreover, since the solid wire was low in electric resistance, a current value per feed was increased, as a result, heat input and arc force were large, and consequently the burn-through resistance and the undercut resistance were not good.

In No. 68, since the content of Si was excessively high, deoxidization was excessive, so that the burn-through resistance and the undercut resistance were not good, and embrittlement of the weld metal was found.

In Nos. 69 and 70, since the content of Mn was excessively low, hardness was insufficient. That is, a welded part was insufficient in strength, and not available for general purpose. Moreover, since the solid wire was low in electric resistance, a current value per feed was increased, as a result, heat input and arc force were large, and consequently the burn-through resistance and the undercut resistance were not good. Moreover, embrittlement of the weld metal was found.

In No. 71, since the content of Mn was excessively high, deoxidization was excessive, so that the burn-through resistance and the undercut resistance were not good. Moreover, since a large amount of slag was produced, the encapsulation ratio of slag was increased. That is, bad painting adaptability was suggested.

In No. 72, since the content of each of Mn and N was excessively high, deoxidization was excessive, so that the burn-through resistance and the undercut resistance were not good. Moreover, since a large amount of slag was produced, the encapsulation ratio of slag was increased. That is, bad painting adaptability was suggested. Furthermore, embrittlement of the weld metal was found, and crack was induced due to inclusions.

In No. 73, since the content of P was excessively high, solidification crack occurred.

In No. 74, since the content of P was excessively high, and a value calculated from (content of C)+{(content of P)*5} (shown as "value calculated from C+(P*5)" in Tables 1 to 3, hereinafter same) was large, solidification crack occurred. In addition, embrittlement of the weld metal was found, and a large amount of spatter was generated.

In No. 75, since the content of S was excessively low, viscosity and surface tension of a molten pool were not decreased to appropriate ranges. Therefore, the barrier effect for relieving arc force by the preceded molten pool was not obtained. As a result, the burn-through resistance and the undercut resistance were not good.

In No. 76, since the content of S was excessively high, solidification crack occurred. Moreover, since viscosity and surface tension of a droplet were excessively small, and thus the droplet was easily shorted to a molten pool, an extremely large amount of spatter was generated. Furthermore, embrittlement of the weld metal was found. While the burn-through resistance was good, since viscosity and surface tension of a molten pool were excessively small, a bead was easy to drop due to the gravity effect, and consequently undercut at an upper plate side was easily induced (the undercut resistance was not good).

In No. 77, the content of any of C, Si, and S was excessively high. Therefore, solidification crack occurred, the burn-through resistance and the undercut resistance were bad, and a large amount of spatter was generated. In addition, embrittlement of the weld metal was found.

In Nos. 78 and 79, amount of coated oil (amount of adhered oil) was excessively large. Therefore, arc was contracted and concentrated more significantly, thereby the burn-through resistance and the undercut resistance were degraded. Moreover, concentration of C in a molten pool was increased due to thermally decomposed oil, consequently crack occurred.

In No. 80, while the content of each of C and P satisfied the requirement of an embodiment of the invention, the value calculated from (content of C)+{(content of P)*5} was large, therefore solidification crack occurred.

In No. 81, since the content of Cr was excessively high, viscosity and surface tension of a molten pool were excessively large, so that the burn-through resistance and the undercut resistance were not good. Moreover, a large amount of spatter was generated, in addition, a large amount of slag was produced, and therefore the encapsulation ratio of slag was increased. That is, bad painting adaptability was suggested.

In No. 82, since the content of Ni was excessively high, viscosity and surface tension of a molten pool were excessively large, so that the burn-through resistance and the undercut resistance were not good. Moreover, a large amount of spatter was generated.

In No. 83, since the content of Al was excessively high, viscosity and surface tension of a molten pool were excessively large, consequently the burn-through resistance and the undercut resistance were not good.

In Nos. 84, 85, 86, 87, 88 and 89, since the content of Ti, Nb, V, Zr, La and Ce was excessively high respectively, viscosity and surface tension of a molten pool were excessively large. As a result, the burn-through resistance and the undercut resistance were not good. Moreover, a large amount of spatter was generated, in addition, a large amount of slag was produced, so that the encapsulation ratio of slag was increased. That is, bad painting adaptability was suggested.

In No. 90, since the content of B was excessively high, solidification crack occurred.

In No. 91, since the content of N was excessively high, while a blow hole was not produced, weld metal was embrittled. In addition, crack was induced due to inclusions. Moreover, since viscosity and surface tension of a molten pool were excessively small, a bead was easy to drop due to the gravity effect, and consequently undercut at an upper plate side easily occurred (the undercut resistance was not good).

In Nos. 92 and 93, since the content of O was excessively high, inclusions were increased, and crack occurred. Moreover, since viscosity and surface tension of a droplet were excessively small, the droplet was easily shorted to the molten pool, and an extremely large amount of spatter was generated. Furthermore, embrittlement of the weld metal was found. While the burn-through resistance was good, the molten pool was easy to drop by gravity, therefore undercut at the upper plate side tended to occur (the undercut resistance was not good). Moreover, a large amount of slag was produced, consequently the encapsulation ratio of the slag was increased. That is, bad painting adaptability was suggested.

In No. 94, since the content of Mo was excessively high, viscosity and surface tension of a molten pool were excessively large. As a result, the burn-through resistance and the undercut resistance were not good. Moreover, a large amount of spatter was generated.

In No. 95, which is one of commercially available solid wires, the content of each of Si and S was excessively low compared with the requirement of an embodiment of the invention, and the content of P, the value calculated from (content of C)+{(content of P)*5}, and the amount of adhered oil were excessively large compared with the requirement of an embodiment of the invention. Since the content of Si was excessively low, a welded part was insufficient in hardness. That is, a welded part was insufficient in strength, and therefore not able to be available for general purpose. Moreover, since electric resistance of the solid wire was low, a current value per feed was increased, consequently heat input or arc force was increased. Furthermore, since the content of S was excessively low, viscosity and surface tension of a molten pool were not decreased to appropriate ranges. Therefore, the barrier effect on arc force by the preceded molten pool was not obtained, and therefore burn-through and undercut easily occurred. Since the content of P was excessively high, and the value calculated from (content of C)+{(content of P)*5} was larger, crack also occurred.

In No. 96, which is also one of commercially available solid wires, the content of each of C, Mn, B and Mo was excessively high, in addition, the value calculated from (content of C)+{ (content of P)*5} was excessively large, and the amount of adhered oil was excessively large, and the content of S was excessively low. The content of C and B and the amount of adhered oil were excessively high, resulting in uranami welding, thereby crack was induced. Moreover, since the content of each of C, Mn and Mo was excessively high, and the content of S was excessively low, viscosity and surface tension of a molten pool were significantly increased. As a result, the burn-through resistance and the undercut resistance were not good. Moreover, a large amount of spatter was generated. Furthermore, since the content of Mn was high, a large amount of slag was produced, consequently the encapsulation ratio of slag was increased. That is, bad painting adaptability was suggested.

In No. 97, since the content of each of O and N, and the amount of adhered oil were excessive respectively, viscosity of a molten pool was excessively small, and a bead was easy to drop due to gravity, consequently undercut at an upper plate side tended to occur (the undercut resistance was not good). Moreover, since the amount of adhered oil was excessively large, arc was constructed, and the burn-through resistance was thus reduced. Furthermore, since inclusions were increased, embrittlement of weld metal was found, in addition, solidification crack occurred. In addition, a large amount of oxide slag was produced, so that the encapsulation ratio of slag was increased. That is, bad painting adaptability was suggested.

In No. 98, since the content of O, and the amount of adhered oil were excessive respectively, viscosity of a molten pool was excessively small, and a bead was easy to drop due to gravity, consequently undercut at an upper plate side tended to occur (the undercut resistance was not good). Moreover, since the amount of adhered oil was excessively large, arc was constructed, and the burn-through resistance was thus reduced. Furthermore, since inclusions were increased, and the content of C in the molten pool was increased by C generated by thermal decomposition of oil, solidification crack occurred. Moreover, a large amount of oxide slag was produced, so that the encapsulation ratio of slag was increased. That is, bad painting adaptability was suggested.

In No. 99, since the amount of adhered oil was excessively large, arc was constructed and concentrated more significantly, thereby the burn-through resistance and the undercut resistance were not good. Moreover, since the content of C in the molten pool was increased by C generated by the thermal decomposition, crack occurred.

In No. 100, since the content of S was excessively low, viscosity and surface tension of a molten pool were not decreased to appropriate ranges, and therefore the barrier effect on arc force by the preceded molten pool was not obtained. Therefore, the burn-through resistance and the undercut resistance were not good.

In No. 101, while the content of each of C and P satisfied the requirement of an embodiment of the invention, the value calculated from (content of C)+{(content of P)*5} exceeded the requirement of an embodiment of the invention, therefore solidification crack occurred.

What is claimed is:

1. A solid wire comprising:
    C 0.005 to 0.080 mass percent,
    Si 0.30 to 1.20 mass percent,
    Mn 1.15 to 1.65 mass percent,
    Al 0.006 to 0.040 mass percent, and
    S 0.053 to 0.200 mass percent; and
    the solid wire being controlled to contain
    P 0.017 mass percent or less,
    O 0.0070 mass percent or less, and
    N 0.0050 mass percent or less respectively,
    in which (content of C)+{(content of P) multiplied by 5}≦0.135 mass percent is satisfied, and
    the solid wire being further controlled to contain as impurities Ti 0.15 mass percent or less, Zr 0.10 mass percent or less, B 0.0050 mass percent or less, and Cr, Ni, Nb, V, La and Ce 0.20 mass percent or less respectively,
    wherein amount of oil adhered on a surface of the relevant solid wire is controlled to be 1.2 g or less per wire of 10 kg.

2. The solid wire according to claim 1, further comprising:
    Mo 0.30 mass percent or less.

3. The solid wire according to claim 1:
    wherein K, Li, Na and Ca are adhered on the surface of the wire at 0.005 to 0.300 g per wire of 10 kg in total.

4. The solid wire according to claim 1:
    wherein $MoS_2$ are adhered on the surface of the wire at 0.01 to 1.00 g per wire of 10 kg.

5. The solid wire according to claim 1:
    wherein the surface of the wire is applied with copper plating.

6. The solid wire according to claim 1:
    wherein the solid wire is a copper-plating-free wire of which the surface is not applied with copper plating.

7. The solid wire according to claim 1, wherein S is present in an amount of 0.080 to 0.200 mass percent.

8. The solid wire according to claim 1, wherein Si is present in an amount of 0.30 to 0.75 mass percent.

9. A solid wire comprising:
    C 0.005 to 0.080 mass percent,
    Si 0.30 to 0.75 mass percent,
    Mn 1.15 to 1.65 mass percent,
    Al 0.006 to 0.040 mass percent, and
    S 0.053 to 0.200 mass percent; and
    the solid wire being controlled to contain
    P 0.017 mass percent or less,
    O 0.0070 mass percent or less, and
    N 0.0050 mass percent or less respectively,
    in which (content of C)+{(content of P) multiplied by 5}≦0.135 mass percent is satisfied, and
    the solid wire being further controlled to contain as impurities Ti, Cr and Ni 0.05 mass percent or less respectively, Zr, Nb, V, La and Ce 0.01 mass percent or less respectively, and B 0.0050 mass percent or less,
    wherein amount of oil adhered on a surface of the relevant solid wire is controlled to be 1.2 g or less per wire of 10 kg.

10. The solid wire according to claim 9, wherein S is present in an amount of 0.080 to 0.200 mass percent.

11. A solid wire comprising:
    C 0.005 to 0.050 mass percent,
    Si 0.30 to 0.75 mass percent,
    Mn 1.15 to 1.65 mass percent,
    Al 0.006 to 0.040 mass percent, and
    S 0.053 to 0.200 mass percent; and
    the solid wire being controlled to contain
    P 0.017 mass percent or less,
    O 0.0070 mass percent or less, and
    N 0.0050 mass percent or less respectively,
    in which (content of C)+{(content of P) multiplied by 5}≦0.135 mass percent is satisfied, and
    the solid wire being further controlled to contain as impurities Ti, Cr and Ni 0.05 mass percent or less respectively, Zr, Nb, V, La and Ce 0.01 mass percent or less respectively, and B 0.0050 mass percent or less,
    wherein amount of oil adhered on a surface of the relevant solid wire is controlled to be 1.2 g or less per wire of 10 kg.

12. The solid wire according to claim 11, wherein S is present in an amount of 0.080 to 0.200 mass percent.

* * * * *